US010575096B2

(12) United States Patent
Wang

(10) Patent No.: US 10,575,096 B2
(45) Date of Patent: Feb. 25, 2020

(54) SOUND PROCESSING METHOD AND APPARATUS

(71) Applicant: Huawei Technologies Co., Ltd., Shenzhen (CN)

(72) Inventor: Lelin Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/397,666

(22) Filed: Apr. 29, 2019

(65) Prior Publication Data

US 2019/0253802 A1    Aug. 15, 2019

Related U.S. Application Data

(63) Continuation of application No. PCT/CN2017/106905, filed on Oct. 19, 2017.

(30) Foreign Application Priority Data

Oct. 27, 2016    (CN) .......................... 2016 1 0970977

(51) Int. Cl.
*H04R 5/04*    (2006.01)
*H04R 5/027*    (2006.01)
(Continued)

(52) U.S. Cl.
CPC ................ *H04R 5/04* (2013.01); *G01S 11/14* (2013.01); *G06K 9/00221* (2013.01);
(Continued)

(58) Field of Classification Search
CPC . H04R 5/04; H04R 3/005; H04R 3/04; H04R 5/027; G10L 21/0208; G10L 21/0224
(Continued)

(56) References Cited

U.S. PATENT DOCUMENTS 7,684,982 B2    3/2010 Taneda
9,197,974 B1 *  11/2015 Clark ...................... H04M 9/08
(Continued)

FOREIGN PATENT DOCUMENTS

| CN | 101203063 A | 6/2008 |
| CN | 104270489 A | 1/2015 |
| CN | 107026934 A | 8/2017 |

OTHER PUBLICATIONS

Machine Translation and Abstract of Chinese Publication No. CN101203063, Jun. 18, 2008, 18 pages.
(Continued)

*Primary Examiner* — David L Ton
(74) *Attorney, Agent, or Firm* — Conley Rose, P.C.

(57) ABSTRACT

A method includes acquiring sound signals of a current frame using two microphones, calculating an interaural level difference between the two microphones based on the sound signals of the current frame according to a first preset algorithm, determining whether the interaural level difference satisfies a sound source direction determining condition, determining, based on the interaural level difference, whether the sound signals of the current frame include a backward sound signal if the determining condition is satisfied, filtering out the backward sound signal from the sound signals of the current frame.

22 Claims, 5 Drawing Sheets

(51) Int. Cl.
*H04R 3/04* (2006.01)
*H04R 3/00* (2006.01)
*G10L 21/0224* (2013.01)
*G10L 21/0208* (2013.01)
*G01S 11/14* (2006.01)
*H04M 1/725* (2006.01)
*G06K 9/00* (2006.01)

(52) U.S. Cl.
CPC ...... *G06K 9/00268* (2013.01); *G10L 21/0208* (2013.01); *G10L 21/0224* (2013.01); *H04M 1/7255* (2013.01); *H04R 3/005* (2013.01); *H04R 3/04* (2013.01); *H04R 5/027* (2013.01)

(58) Field of Classification Search
USPC .............................................. 381/94.1, 94.7
See application file for complete search history.

(56) References Cited

U.S. PATENT DOCUMENTS

| | | | |
|---|---|---|---|
| 2005/0031136 | A1 | 2/2005 | Du et al. |
| 2009/0220107 | A1* | 9/2009 | Every .................. G10L 21/0208 381/94.7 |
| 2009/0323982 | A1* | 12/2009 | Solbach ................. H04R 3/005 381/94.3 |
| 2010/0110232 | A1 | 5/2010 | Zhang et al. |
| 2012/0155703 | A1 | 6/2012 | Hernandez-Abrego et al. |
| 2012/0163624 | A1 | 6/2012 | Hyun |
| 2012/0288113 | A1 | 11/2012 | Akino et al. |
| 2015/0245133 | A1 | 8/2015 | Kim et al. |
| 2016/0234621 | A1* | 8/2016 | Faller ..................... H04R 3/005 |
| 2018/0233158 | A1* | 8/2018 | Ray ..................... G10L 21/0208 |

OTHER PUBLICATIONS

Machine Translation and Abstract of Chinese Publication No. CN104270489, Jan. 7, 2015, 10 pages.
Machine Translation and Abstract of Chinese Publication No. CN107026934, Aug. 8, 2017, 42 pages.
Foreign Communication From a Counterpart Application, PCT Application No. PCT/CN2017/106905, English Translation of International Search Report dated Jan. 19, 2018, 2 pages.
Foreign Communication From a Counterpart Application, PCT Application No. PCT/CN2017/106905, English Translation of Written Opinion dated Jan. 19, 2018, 5 pages.
Ruffier, F., et al., "A tiny directional sound sensor inspired by crickets designed for Micro-Air Vehicles," XP032093184, 2011 IEEE Sensors Proceedings, Oct. 28, 2011, pp. 970-973.
Karunasiri, G., et al., "MEMS Directional Acoustic Sensor for Locating Sound Sources," XP060081593, Proceedings of SPIE, vol. 10036, Feb. 3, 2016, pp. 100361A-1-100361A-7.
Foreign Communication From a Counterpart Application, European Application No. 17863390.5, Extended European Search Report dated Oct. 8, 2019, 10 pages.

* cited by examiner

SOUND PROCESSING METHOD AND APPARATUS

CROSS-REFERENCE TO RELATED APPLICATIONS

This application is a continuation of International Application No. PCT/CN2017/106905, filed on Oct. 19, 2017, which claims priority to Chinese Patent Application No. 201610970977.5, filed on Oct. 27, 2016, The disclosures of the aforementioned applications are hereby incorporated by reference in their entireties.

TECHNICAL FIELD

The present disclosure relates to the field of terminal technologies, and in particular, to a sound processing method and apparatus.

BACKGROUND

When a voice processing device acquires or inputs a voice signal, interference from various types of noise inevitably exists. In an actual voice communications system, common noise includes stationary noise and a directional interference sound source. Such noise easily causes interference to a target sound signal, and severely reduces acoustic comfort and speech intelligibility of acquired sound. Effects of a conventional noise estimation algorithm and a conventional single-channel voice quality enhancement algorithm in suppressing directional interference noise are very unsatisfactory. Therefore, some systems having an interference noise suppression capability need to be designed according to an actual situation, to directionally pick up a target voice, and implement a capability of suppressing other noise.

Most of existing sound source positioning algorithms use a beamforming technology, a sound source positioning technology based on a delay difference, and the like, to position a sound source direction in a sound field, and then use a fixed beam or an adaptive beam, to reduce an interference sound source beyond a beam, and implement directional sound pickup.

Based on a photographing scenario of a terminal, a user uses a camera of the terminal to perform photographing. In an existing sound source positioning technology based on a delay difference, in a scenario of a low signal-to-noise ratio, direction information of a target sound source (a sound source in a direction the same as a photographing direction of a camera) is often mixed with direction information of a noise source (a sound source in a direction opposite to the photographing direction of the camera). Therefore, during video capturing, a lot of noise exists, leading to low pickup precision of the target sound source. Consequently, a lot of noise still exists in final captured content.

SUMMARY

Embodiments of the present disclosure provide a sound processing method and apparatus, to resolve an existing problem that when a target sound signal is directionally picked up, severe noise mixing exists, leading to a problem of low pickup precision of a target sound source.

Specific technical solutions provided in the embodiments of the present disclosure are as follows. According to a first aspect, an embodiment of the present disclosure provides a sound processing method. The method is applied to a terminal having two microphones at the top, the two microphones are respectively located on a front surface and a back surface of the terminal, and the method includes, when a camera of the terminal is in a photographing state, acquiring sound signals of a current frame in a current environment of the terminal using the two microphones, calculating an interaural level difference between the two microphones based on the acquired sound signals of the current frame according to a first preset algorithm, determining whether the interaural level difference between the two microphones for the current frame satisfies a sound source direction determining condition, if the sound source direction determining condition is satisfied, determining, based on the interaural level difference between the two microphones for the current frame, whether the sound signals of the current frame include a backward sound signal, where the backward sound signal is a sound signal whose sound source is located at the back of the camera, and if it is determined that the sound signals of the current frame include the backward sound signal, filtering out the backward sound signal from the sound signals of the current frame.

According to a second aspect, an embodiment of the present disclosure provides a sound processing apparatus. The apparatus is applied to a terminal having two microphones at the top, the two microphones are respectively located on a front surface and a back surface of the terminal, and the apparatus includes an acquisition module configured to, when a camera of the terminal is in a photographing state, acquire sound signals of a current frame in a current environment of the terminal using the two microphones, a calculation module configured to calculate an interaural level difference between the two microphones based on the acquired sound signals of the current frame according to a first preset algorithm, a judging module configured to determine whether the interaural level difference between the two microphones for the current frame satisfies a sound source direction determining condition, a determining module configured to, if the sound source direction determining condition is satisfied, determine, based on the interaural level difference between the two microphones for the current frame, whether the sound signals of the current frame include a backward sound signal, where the backward sound signal is a sound signal whose sound source is located at the back of the camera, and a filtering module configured to, if it is determined that the sound signals of the current frame include the backward sound signal, filter out the backward sound signal from the sound signals of the current frame.

According to the foregoing technical solutions of the method and the apparatus that are provided in the embodiments of the present disclosure, the backward sound signal in the sound signals can be determined using a particular algorithm, and filtered out. Therefore, during photographing, a noise signal beyond a photographing range can be filtered out, thereby ensuring sound quality of a video during photographing, and improving user experience.

According to the first aspect or the second aspect, in a possible design, the terminal needs to detect the photographing state of the camera, and when detecting whether the camera performs photographing, may further determine a position of the camera. If the terminal has only one camera, a position of the camera may be directly obtained. If the terminal has a plurality of cameras, when whether the camera is in the photographing state is detected, a specific camera that is performing photographing may be further determined such that a processor performs subsequent signal processing based on a position of the camera using a corresponding algorithm. When the photographing state of the camera is detected, detection may be performed using a timing program, or an enable signal of the camera may be detected, or another manner may be used for implementation.

This step may be completed by the acquisition module. In an embodiment, the processor may invoke a program and an instruction in a memory, to perform a corresponding operation. In the solution in the design, an enabled state of the camera and the position of the camera can be obtained.

According to the first aspect or the second aspect, in a possible design, the acquiring sound signals of a current frame in a current environment of the terminal using the two microphones includes acquiring, using the two microphones, the sound signals S1 and S2 of the current frame, and the calculating an interaural level difference between the two microphones based on the acquired sound signals according to a first preset algorithm includes calculating power spectrums $P_1$ and $P_2$ of S1 and S2 based on S1 and S2 using a fast Fourier transformation (FFT) algorithm, and calculating the interaural level difference between the two microphones based on $P_1$ and $P_2$ using the following formula:

$$ILD_{now} = \frac{P_1 - P_2}{P_1 + P_2}$$

where $P_1$ indicates a power sound spectrum corresponding to the top-front microphone in the current frame, $P_2$ indicates a power sound spectrum corresponding to the top-back microphone in the current frame, $P_1$ and $P_2$ each are a vector having N elements, the N elements are values of N corresponding frequency points that are obtained after fast Fourier transformation is performed on the sound signals of the current frame, and N is an integer greater than 1, and an interaural level difference (ILD) now ($ILD_{now}$) is a vector including interaural level differences corresponding to the N frequency points.

This step may be completed by the acquisition module and the calculation module. In an embodiment, the processor may control the microphone and an audio circuit to acquire sound signals, and invoke a program and an instruction in the memory to perform a corresponding operation on the acquired sound signals. In the solution in the design, the interaural level difference can be calculated. It should be noted that, many alternatives exist for a method for calculating the interaural level difference, and are not listed one by one herein.

According to the first aspect or the second aspect, in a possible design, the determining whether the interaural level difference between the two microphones for the current frame satisfies a sound source direction determining condition includes calculating, according to a second preset algorithm using an interaural level difference between the two microphones that corresponds to an $i^{th}$ frequency point, a maximum reference value and a minimum reference value that correspond to the $i^{th}$ frequency point, where the $i^{th}$ frequency point is one of the N frequency points, and i is assumed to be all positive integers not greater than N, and if a difference between the maximum reference value and the minimum reference value of the $i^{th}$ frequency point is greater than a first threshold corresponding to the $i^{th}$ frequency point, determining that the interaural level difference between the two microphones satisfies the sound source direction determining condition on the $i^{th}$ frequency point, if a difference between the maximum reference value and the minimum reference value is not greater than a first threshold corresponding to the $i^{th}$ frequency point, determining that the interaural level difference between the two microphones does not satisfy the sound source direction determining condition on the $i^{th}$ frequency point, or if M frequency points in the N frequency points satisfy the sound source direction determining condition, determining that the interaural level difference between the two microphones for the current frame satisfies the sound source direction determining condition, where M is greater than or equal to N/2.

This step may be completed by the judging module. In an embodiment, the processor may invoke a program and an instruction in the memory, to perform a corresponding operation. In the solution in the design, a rule for determining whether noise can be determined using the interaural level difference is provided, to provide a use basis for how to properly use the interaural level difference subsequently. A plurality of alternatives may exist for a specific determining method, and this is not limited in the present disclosure. The first threshold may be set as required based on an empirical value, and this is not limited in the present disclosure either.

According to the first aspect or the second aspect, in a possible design, the calculating, according to a second preset algorithm using an interaural level difference between the two microphones that corresponds to an $i^{th}$ frequency point, a maximum reference value and a minimum reference value that correspond to the $i^{th}$ frequency point includes obtaining a maximum reference value corresponding to an $(i-1)^{th}$ frequency point, where the $(i-1)^{th}$ frequency point is a previous frequency point of the $i^{th}$ frequency point, and when an interaural level difference between the two microphones that corresponds to the $i^{th}$ frequency point is not greater than the maximum reference value corresponding to the $(i-1)^{th}$ frequency point, calculating, using the following formula, the maximum reference value corresponding to the $i^{th}$ frequency point:

$$ILD_{max}=\alpha_{low}*ILD_{now}+(1-\alpha_{low})*ILD_{max}', \text{ or}$$

when the interaural level difference between the two microphones that corresponds to the $i^{th}$ frequency point is greater than the maximum reference value corresponding to the $(i-1)^{th}$ frequency point, calculating, using the following formula, the maximum reference value corresponding to the $i^{th}$ frequency point:

$$ILD_{max}=\alpha_{fast}*ILD_{now}+(1-\alpha_{fast})*ILD_{max}', \text{ and}$$

obtaining a minimum reference value corresponding to the $(i-1)^{th}$ frequency point, and when the interaural level difference between the two microphones that corresponds to the $i^{th}$ frequency point is greater than the minimum reference value corresponding to the $(i-1)^{th}$ frequency point, calculating, using the following formula, the minimum reference value corresponding to the $i^{th}$ frequency point:

$$ILD_{min}=\alpha_{low}*ILD_{now}+(1-\alpha_{low})*ILD_{min}', \text{ or}$$

when the interaural level difference between the two microphones that corresponds to the $i^{th}$ frequency point is not greater than the minimum reference value corresponding to the $(i-1)^{th}$ frequency point, calculating, using the following formula, the minimum reference value corresponding to the $i^{th}$ frequency point:

$$ILD_{min}=\alpha_{fast}*ILD_{now}+(1-\alpha_{fast})*ILD_{min}',$$

where $ILD_{now}$ indicates the interaural level difference between the two microphones that corresponds to the $i^{th}$ frequency point, $ILD_{max}$ indicates the maximum reference value corresponding to the $i^{th}$ frequency point, $ILD_{max}'$ indicates the maximum reference value corresponding to the $(i-1)^{th}$ frequency point, $ILD_{min}$ indicates the minimum reference value corresponding to the $i^{th}$ frequency point, $ILD_{min}'$ indicates the minimum reference value corresponding to the $(i-1)^{th}$ frequency point, and $\alpha_{fast}$ and $\alpha_{low}$ indicate preset step values, and $\alpha_{fast} > \alpha_{low}$.

This step may be completed by the judging module. In an embodiment, the processor may invoke a program and an instruction in the memory, to perform a corresponding operation. In the solution in the design, a subordinate implementation is provided for the rule for determining whether noise can be determined using the interaural level difference. A plurality of alternatives may exist for a specific determining method, and this is not limited in the present disclosure.

According to the first aspect or the second aspect, in a possible design, the determining, based on the interaural level difference between the two microphones for the current frame, whether the sound signals of the current frame include a backward sound signal includes, when an interaural level difference corresponding to a $j^{th}$ frequency point is less than a second threshold corresponding to the $j^{th}$ frequency point, determining that a backward sound signal is included on the $j^{th}$ frequency point, where the $j^{th}$ frequency point is one of the M frequency points, and j is assumed to be all positive integers not greater than M, or when an interaural level difference between the two microphones that corresponds to a $j^{th}$ frequency point is not less than a second threshold, determining that no backward sound signal is included on the $j^{th}$ frequency point.

This step may be completed by the determining module. In an embodiment, the processor may invoke a program and an instruction in the memory, to perform a corresponding operation. In the solution in the design, a final manner of determining noise using the interaural level difference is provided such that the backward sound signal can be accurately identified. The second threshold may be set as required based on an empirical value.

According to the first aspect or the second aspect, in a possible design, the filtering out the backward sound signal from the sound signals of the current frame includes, if it is detected that the camera of the terminal that is performing photographing is a front-facing camera, using a sound signal acquired by the top-back microphone as a reference signal, and controlling an adaptive filter in the terminal to filter out a backward sound signal from a sound signal of the current frame that is acquired by the top-front microphone, or if it is detected that the camera of the terminal that is performing photographing is a rear-facing camera, using a sound signal acquired by the top-front microphone as a reference signal, and controlling an adaptive filter in the terminal to filter out a backward sound signal from a sound signal of the current frame that is acquired by the top-back microphone.

This step may be completed by the filtering module. In an embodiment, the processor may invoke a program and an instruction in the memory, to perform a corresponding operation. In the solution in the design, a method of how to perform noise processing for cameras at different positions is provided.

According to the first aspect or the second aspect, in a possible design, when the terminal further includes a third microphone at the bottom, where a position of the third microphone at the bottom is not limited, and the camera that is performing photographing is a front-facing camera, the method further includes performing delay difference based positioning on sound signals of the current frame that are acquired by the third microphone and the top-front microphone, to obtain an up-down azimuth of the sound signals of the current frame, when the up-down azimuth is greater than a first preset angle, determining that the sound signals of the current frame include a secondary noise signal, where in this case, the secondary noise signal is a noise signal located in front of the front-facing camera and located beyond a photographing range of the front-facing camera, and when it is determined that the sound signals of the current frame include the secondary noise signal, using a sound signal acquired by the top-back microphone as a reference signal, and controlling the adaptive filter in the terminal to filter out the secondary noise signal from a sound signal of the current frame that is acquired by the top-front microphone.

In a specific implementation process, the apparatus may further include a secondary noise filtering module configured to perform the foregoing method. In an embodiment, the processor may invoke a program and an instruction in the memory, to perform a corresponding operation. In the solution in the design, when a bottom microphone exists, processing may be further performed on secondary noise.

According to the first aspect or the second aspect, in a possible design, if the terminal further includes a fourth microphone at the bottom, and the third microphone and the fourth microphone are arranged at the bottom of the terminal from left to right, where specific positions are not limited, the method further includes performing delay difference based positioning on sound signals of the current frame that are acquired by the third microphone and the fourth microphone, to obtain a left-right azimuth of the sound signals of the current frame, when the left-right azimuth is greater than a second preset angle, determining that the sound signals of the current frame include a secondary noise signal, and when it is determined that the sound signals of the current frame include the secondary noise signal, using a sound signal acquired by the top-back microphone as a reference signal, and controlling the adaptive filter in the terminal to filter out the secondary noise signal from a sound signal of the current frame that is acquired by the top-front microphone. It should be noted that, an up-down azimuth and a left-right azimuth can both be used to determine a secondary noise signal, but the up-down azimuth and the left-right azimuth focus on different sound source directions, and can be mutually complementary. Determining a secondary noise signal using a combination of the up-down azimuth and the left-right azimuth is more comprehensive and accurate than determining a secondary noise signal by separately using the up-down azimuth or the left-right azimuth.

In a specific implementation process, the apparatus may further include a secondary noise filtering module configured to perform the foregoing method. In an embodiment, the processor may invoke a program and an instruction in the memory, to perform a corresponding operation. In the solution in the design, when two microphones exist at the bottom, processing may be further performed on secondary noise.

According to the first aspect or the second aspect, in a possible design, when the terminal further includes a third microphone at the bottom, where a position of the third microphone at the bottom is not limited, and the camera that is performing photographing is a rear-facing camera, the method further includes performing delay difference based positioning on sound signals of the current frame that are acquired by the third microphone and the top-back microphone, to obtain an up-down azimuth of the sound signals of the current frame, when the up-down azimuth is greater than a first preset angle, determining that the sound signals of the current frame include a secondary noise signal, where in this case, the secondary noise signal is a noise signal located in front of the rear-facing camera and located beyond a photographing range of the rear-facing camera, and when it is determined that the sound signals of the current frame include the secondary noise signal, using a sound signal acquired by the top-front microphone as a reference signal, and controlling the adaptive filter in the terminal to filter out the secondary noise signal from a sound signal of the current frame that is acquired by the top-back microphone.

In a specific implementation process, the apparatus may further include a secondary noise filtering module configured to perform the foregoing method. In an embodiment, the processor may invoke a program and an instruction in the memory, to perform a corresponding operation. In the solution in the design, when a bottom microphone exists, processing may be further performed on secondary noise.

According to the first aspect or the second aspect, in a possible design, if the terminal further includes a fourth microphone at the bottom, and the third microphone and the fourth microphone are arranged at the bottom of the terminal from left to right, the method further includes performing delay difference based positioning on sound signals of the current frame that are acquired by the third microphone and the fourth microphone, to obtain a left-right azimuth of the sound signals of the current frame, when the left-right azimuth is greater than a second preset angle, determining that the sound signals of the current frame include a secondary noise signal, and when it is determined that the sound signals of the current frame include the secondary noise signal, using a sound signal acquired by the top-front microphone as a reference signal, and controlling the adaptive filter in the terminal to filter out the secondary noise signal from a sound signal of the current frame that is acquired by the top-back microphone. It should be noted that, an up-down azimuth and a left-right azimuth can both be used to determine a secondary noise signal, but the up-down azimuth and the left-right azimuth focus on different sound source directions, and can be mutually complementary. Determining a secondary noise signal using a combination of the up-down azimuth and the left-right azimuth is more comprehensive and accurate than determining a secondary noise signal by separately using the up-down azimuth or the left-right azimuth.

In a specific implementation process, the apparatus may further include a secondary noise filtering module configured to perform the foregoing method. In an embodiment, the processor may invoke a program and an instruction in the memory, to perform a corresponding operation. In the solution in the design, when two microphones exist at the bottom, processing may be further performed on secondary noise.

According to a third aspect, an embodiment of the present disclosure provides a sound processing terminal device. The device includes microphones, a camera, a memory, and a processor, where they are connected to each other using a bus, the microphone is configured to acquire a sound signal under control of the processor, the camera is configured to acquire an image signal under control of the processor, the memory is configured to store a computer program and an instruction, and the processor is configured to invoke the computer program and the instruction that are stored in the memory, to perform the method according to any one of the foregoing possible designs.

According to the third aspect, in a possible design, the terminal device further includes an antenna system, under control of the processor, the antenna system receives and sends a wireless communication signal, to implement wireless communication with a mobile communications network, and the mobile communications network includes one or more of the following a Global System for Mobile Communications (GSM) network, a Code Division Multiple Access (CDMA) network, a third generation (3G) network, a Frequency Division Multiple Access (FDMA) network, a Time Division Multiple Access (TDMA) network, a Primary Domain Controller (PDC) network, a Total Access Communication System (TACS) network, an Advanced Mobile Phone System (AMPS) network, a Wideband Code Division Multiple Access (WCDMA) network, a Time Division Synchronous Code Multiple Access (TDSCDMA) network, a wireless fidelity (WiFi) network, and a Long Term Evolution (LTE) network.

According to a fourth aspect, an embodiment of the present disclosure provides a sound processing method. The method is applied to a terminal having two microphones at the top, the two microphones are respectively located on a front surface and a back surface of the terminal, and the method includes, when the terminal is in a state of a video call, determining whether there is a target user within a photographing range of a camera of the terminal, and if it is determined that there is a target user within the photographing range, acquiring sound signals of a current frame in a current environment of the terminal using the two microphones, calculating an interaural level difference between the two microphones based on the acquired sound signals of the current frame according to a first preset algorithm, determining whether the interaural level difference between the two microphones for the current frame satisfies a sound source direction determining condition, if the sound source direction determining condition is satisfied, determining, based on the interaural level difference between the two microphones for the current frame, whether the sound signals of the current frame include a backward sound signal, where the backward sound signal is a sound signal whose sound source is located at the back of the camera, and if it is determined that the sound signals of the current frame include the backward sound signal, filtering out the backward sound signal from the sound signals of the current frame.

According to a fifth aspect, an embodiment of the present disclosure provides a sound processing apparatus. The apparatus is applied to a terminal having two microphones at the top, the two microphones are respectively located on a front surface and a back surface of the terminal, and the apparatus includes an identification module configured to, when the terminal is in a state of a video call, determine whether there is a target user within a photographing range of a camera of the terminal, an acquisition module configured to, when the identification module identifies that there is a target user within the photographing range, acquire sound signals of a current frame in a current environment of the terminal using the two microphones, a calculation module configured to calculate an interaural level difference between the two microphones based on the acquired sound signals of the current frame according to a first preset algorithm, a judging module configured to determine whether the interaural level difference between the two microphones for the current frame satisfies a sound source direction determining condition, a determining module configured to, if the sound source direction determining condition is satisfied, determine, based on the interaural level difference between the two microphones for the current frame, whether the sound signals of the current frame include a backward sound signal, where the backward sound signal is a sound signal whose sound source is located at the back of the camera, and a filtering module configured to, if it is determined that the sound signals of the current frame include the backward sound signal, filter out the backward sound signal from the sound signals of the current frame.

According to the foregoing technical solutions of the method and the apparatus that are provided in the embodiments of the present disclosure, the backward sound signal in the sound signals can be determined using a particular algorithm, and filtered out. Therefore, during photographing, for example, in a scenario of a video call, a noise signal beyond the photographing range can be filtered out, thereby ensuring sound quality of a video, and improving user experience.

According to the fourth aspect or the fifth aspect, in a possible design, the terminal needs to detect the photographing state of the camera, and when detecting whether the camera performs photographing, may further determine a position of the camera (for example, a front-facing camera or a rear-facing camera). If the terminal has only one camera, a position of the camera may be directly obtained. If the terminal has a plurality of cameras, when whether the camera is in the photographing state is detected, a specific camera that is performing photographing may be further determined such that a processor performs subsequent signal processing based on a position of the camera using a corresponding algorithm. When the photographing state of the camera is detected, detection may be performed using a timing program, or an enable signal of the camera may be detected, or another manner may be used for implementation.

This step may be completed by the identification module or the acquisition module. In an embodiment, the processor may invoke a program and an instruction in a memory, to perform a corresponding operation.

According to the fourth aspect or the fifth aspect, in a possible design, when detecting the photographing state of the camera, the terminal may further determine a scenario in which the camera is turned on, for example, whether regular video recording is performed or a real-time video call is made. The foregoing state detection and scenario determining may be implemented by the processor by identifying an enable signal using a program instruction.

This step may be completed by the identification module or the acquisition module. In an embodiment, the processor may invoke a program and an instruction in the memory, to perform a corresponding operation.

According to the fourth aspect or the fifth aspect, in a possible design, determining that there is a target user within the photographing range includes, detecting, using a portrait recognition technology, that there is any user within the photographing range, or detecting, using a facial recognition technology, that there is a user whose facial feature is the same as a prestored facial template within the photographing range, or detecting, using a lip movement detection technology, that there is a user whose lip moves.

This step may be completed by the identification module. In an embodiment, the processor may invoke a program and an instruction in the memory, to perform a corresponding operation.

According to the fourth aspect or the fifth aspect, in a possible design, the acquiring sound signals of a current frame in a current environment of the terminal using the two microphones includes acquiring, using the two microphones, the sound signals S1 and S2 of the current frame, and the calculating an interaural level difference between the two microphones based on the acquired sound signals according to a first preset algorithm includes calculating power spectrums $P_1$ and $P_2$ of S1 and S2 based on S1 and S2 using a fast Fourier transformation FFT algorithm, and calculating the interaural level difference between the two microphones based on $P_1$ and $P_2$ using the following formula:

$$ILD_{now} = \frac{P_1 - P_2}{P_1 + P_2}$$

where $P_1$ indicates a power sound spectrum corresponding to the top-front microphone in the current frame, $P_2$ indicates a power sound spectrum corresponding to the top-back microphone in the current frame, $P_1$ and $P_2$ each are a vector having N elements, the N elements are values of N corresponding frequency points that are obtained after fast Fourier transformation is performed on the sound signals of the current frame, and N is an integer greater than 1, and $ILD_{now}$ is a vector including interaural level differences corresponding to the N frequency points.

This step may be completed by the acquisition module and the calculation module. In an embodiment, the processor may control the microphone and an audio circuit to acquire sound signals, and invoke a program and an instruction in the memory to perform a corresponding operation on the acquired sound signals.

According to the fourth aspect or the fifth aspect, in a possible design, the determining whether the interaural level difference between the two microphones for the current frame satisfies a sound source direction determining condition includes calculating, according to a second preset algorithm using an interaural level difference between the two microphones that corresponds to an $i^{th}$ frequency point, a maximum reference value and a minimum reference value that correspond to the $i^{th}$ frequency point, where the $i^{th}$ frequency point is one of the N frequency points, and i is assumed to be all positive integers not greater than N, and if a difference between the maximum reference value and the minimum reference value of the $i^{th}$ frequency point is greater than a first threshold corresponding to the $i^{th}$ frequency point, determining that the interaural level difference between the two microphones satisfies the sound source direction determining condition on the $i^{th}$ frequency point, if a difference between the maximum reference value and the minimum reference value is not greater than a first threshold corresponding to the $i^{th}$ frequency point, determining that the interaural level difference between the two microphones does not satisfy the sound source direction determining condition on the $i^{th}$ frequency point, or if M frequency points in the N frequency points satisfy the sound source direction determining condition, determining that the interaural level difference between the two microphones for the current frame satisfies the sound source direction determining condition, where M is greater than or equal to N/2.

This step may be completed by the judging module. In an embodiment, the processor may invoke a program and an instruction in the memory, to perform a corresponding operation.

According to the fourth aspect or the fifth aspect, in a possible design, the calculating, according to a second preset algorithm using an interaural level difference between the two microphones that corresponds to an $i^{th}$ frequency point, a maximum reference value and a minimum reference value that correspond to the $i^{th}$ frequency point includes obtaining a maximum reference value corresponding to an $(i-1)^{th}$ frequency point, where the $(i-1)^{th}$ frequency point is a previous frequency point of the $i^{th}$ frequency point, and when an interaural level difference between the two microphones that corresponds to the $i^{th}$ frequency point is not greater than the maximum reference value corresponding to the $(i-1)^{th}$ frequency point, calculating, using the following formula, the maximum reference value corresponding to the $i^{th}$ frequency point:

$$ILD_{max}=\alpha_{low}*ILD_{now}+(1-\alpha_{low})*ILD_{max}', \text{ or}$$

when the interaural level difference between the two microphones that corresponds to the $i^{th}$ frequency point is greater than the maximum reference value corresponding to the $(i-1)^{th}$ frequency point, calculating, using the following formula, the maximum reference value corresponding to the $i^{th}$ frequency point:

$$ILD_{max}=\alpha_{fast}*ILD_{now}+(1-\alpha_{fast})*ILD_{max}', \text{ and}$$

obtaining a minimum reference value corresponding to the $(i-1)^{th}$ frequency point, and when the interaural level difference between the two microphones that corresponds to the $i^{th}$ frequency point is greater than the minimum reference value corresponding to the $(i-1)^{th}$ frequency point, calculating, using the following formula, the minimum reference value corresponding to the $i^{th}$ frequency point:

$$ILD_{min}=\alpha_{low}*ILD_{now}+(1-\alpha_{low})*ILD_{min}', \text{ or}$$

when the interaural level difference between the two microphones that corresponds to the $i^{th}$ frequency point is not greater than the minimum reference value corresponding to the $(i-1)^{th}$ frequency point, calculating, using the following formula, the minimum reference value corresponding to the $i^{th}$ frequency point:

$$ILD_{min}=\alpha_{fast}*ILD_{now}+(1-\alpha_{fast})*ILD_{min}',$$

where $ILD_{now}$ indicates the interaural level difference between the two microphones that corresponds to the $i^{th}$ frequency point, $ILD_{max}$ indicates the maximum reference value corresponding to the $i^{th}$ frequency point, $ILD_{max}'$ indicates the maximum reference value corresponding to the $(i-1)^{th}$ frequency point, $ILD_{min}$ indicates the minimum reference value corresponding to the $i^{th}$ frequency point, $ILD_{min}'$ indicates the minimum reference value corresponding to the $(i-1)^{th}$ frequency point, and $\alpha_{fast}$ and $\alpha_{low}$ indicate preset step values, and $\alpha_{fast} > \alpha_{low}$.

This step may be completed by the judging module. In an embodiment, the processor may invoke a program and an instruction in the memory, to perform a corresponding operation.

According to the fourth aspect or the fifth aspect, in a possible design, the determining, based on the interaural level difference between the two microphones for the current frame, whether the sound signals of the current frame include a backward sound signal includes, when an interaural level difference corresponding to a $j^{th}$ frequency point is less than a second threshold corresponding to the $j^{th}$ frequency point, determining that a backward sound signal is included on the $j^{th}$ frequency point, where the $j^{th}$ frequency point is one of the M frequency points, and j is assumed to be all positive integers not greater than M, or when an interaural level difference between the two microphones that corresponds to a $j^{th}$ frequency point is not less than a second threshold, determining that no backward sound signal is included on the $j^{th}$ frequency point.

This step may be completed by the determining module. In an embodiment, the processor may invoke a program and an instruction in the memory, to perform a corresponding operation.

According to the fourth aspect or the fifth aspect, in a possible design, the filtering out the backward sound signal from the sound signals of the current frame includes, if it is detected that the camera of the terminal that is performing photographing is a front-facing camera, using a sound signal acquired by the top-back microphone as a reference signal, and controlling an adaptive filter in the terminal to filter out a backward sound signal from a sound signal of the current frame that is acquired by the top-front microphone, or if it is detected that the camera of the terminal that is performing photographing is a rear-facing camera, using a sound signal acquired by the top-front microphone as a reference signal, and controlling an adaptive filter in the terminal to filter out a backward sound signal from a sound signal of the current frame that is acquired by the top-back microphone.

This step may be completed by the filtering module. In an embodiment, the processor may invoke a program and an instruction in the memory, to perform a corresponding operation.

According to the fourth aspect or the fifth aspect, in a possible design, when the terminal further includes a third microphone at the bottom, where a position of the third microphone at the bottom is not limited, and the camera that is performing photographing is a front-facing camera, the method further includes performing delay difference based positioning on sound signals of the current frame that are acquired by the third microphone and the top-front microphone, to obtain an up-down azimuth of the sound signals of the current frame, when the up-down azimuth is greater than a first preset angle, determining that the sound signals of the current frame include a secondary noise signal, where in this case, the secondary noise signal is a noise signal located in front of the front-facing camera and located beyond a photographing range of the front-facing camera, and when it is determined that the sound signals of the current frame include the secondary noise signal, using a sound signal acquired by the top-back microphone as a reference signal, and controlling the adaptive filter in the terminal to filter out the secondary noise signal from a sound signal of the current frame that is acquired by the top-front microphone.

In a specific implementation process, the apparatus may further include a secondary noise filtering module configured to perform the foregoing method. In an embodiment, the processor may invoke a program and an instruction in the memory, to perform a corresponding operation.

According to the fourth aspect or the fifth aspect, in a possible design, if the terminal further includes a fourth microphone at the bottom, and the third microphone and the fourth microphone are arranged at the bottom of the terminal from left to right, where specific positions are not limited, the method further includes performing delay difference based positioning on sound signals of the current frame that are acquired by the third microphone and the fourth microphone, to obtain a left-right azimuth of the sound signals of the current frame, when the left-right azimuth is greater than a second preset angle, determining that the sound signals of the current frame include a secondary noise signal, and when it is determined that the sound signals of the current frame include the secondary noise signal, using a sound signal acquired by the top-back microphone as a reference signal, and controlling the adaptive filter in the terminal to filter out the secondary noise signal from a sound signal of the current frame that is acquired by the top-front microphone. It should be noted that, an up-down azimuth and a left-right azimuth can both be used to determine a secondary noise signal, but the up-down azimuth and the left-right azimuth focus on different sound source directions, and can be mutually complementary. Determining a secondary noise signal using a combination of the up-down azimuth and the left-right azimuth is more comprehensive and accurate than determining a secondary noise signal by separately using the up-down azimuth or the left-right azimuth.

In a specific implementation process, the apparatus may further include a secondary noise filtering module configured to perform the foregoing method. In an embodiment, the processor may invoke a program and an instruction in the memory, to perform a corresponding operation.

According to the fourth aspect or the fifth aspect, in a possible design, when the terminal further includes a third microphone at the bottom, where a position of the third microphone at the bottom is not limited, and the camera that is performing photographing is a rear-facing camera, the method further includes performing delay difference based positioning on sound signals of the current frame that are acquired by the third microphone and the top-back microphone, to obtain an up-down azimuth of the sound signals of the current frame, when the up-down azimuth is greater than a first preset angle, determining that the sound signals of the current frame include a secondary noise signal, where in this case, the secondary noise signal is a noise signal located in front of the rear-facing camera and located beyond a photographing range of the rear-facing camera, and when it is determined that the sound signals of the current frame include the secondary noise signal, using a sound signal acquired by the top-front microphone as a reference signal, and controlling the adaptive filter in the terminal to filter out the secondary noise signal from a sound signal of the current frame that is acquired by the top-back microphone.

In a specific implementation process, the apparatus may further include a secondary noise filtering module configured to perform the foregoing method. In an embodiment, the processor may invoke a program and an instruction in the memory, to perform a corresponding operation.

According to the fourth aspect or the fifth aspect, in a possible design, if the terminal further includes a fourth microphone at the bottom, and the third microphone and the fourth microphone are arranged at the bottom of the terminal from left to right, the method further includes performing delay difference based positioning on sound signals of the current frame that are acquired by the third microphone and the fourth microphone, to obtain a left-right azimuth of the sound signals of the current frame, when the left-right azimuth is greater than a second preset angle, determining that the sound signals of the current frame include a secondary noise signal, and when it is determined that the sound signals of the current frame include the secondary noise signal, using a sound signal acquired by the top-front microphone as a reference signal, and controlling the adaptive filter in the terminal to filter out the secondary noise signal from a sound signal of the current frame that is acquired by the top-back microphone. It should be noted that, an up-down azimuth and a left-right azimuth can both be used to determine a secondary noise signal, but the up-down azimuth and the left-right azimuth focus on different sound source directions, and can be mutually complementary. Determining a secondary noise signal using a combination of the up-down azimuth and the left-right azimuth is more comprehensive and accurate than determining a secondary noise signal by separately using the up-down azimuth or the left-right azimuth.

In a specific implementation process, the apparatus may further include a secondary noise filtering module configured to perform the foregoing method. In an embodiment, the processor may invoke a program and an instruction in the memory, to perform a corresponding operation.

According to a sixth aspect, an embodiment of the present disclosure provides a sound processing terminal device. The device includes microphones, a camera, a memory, and a processor, where they are connected to each other using a bus, the microphone is configured to acquire a sound signal under control of the processor, the camera is configured to acquire an image signal under control of the processor, the memory is configured to store a computer program and an instruction, and the processor is configured to invoke the computer program and the instruction that are stored in the memory, to perform the method according to any one of the foregoing possible designs.

According to the sixth aspect, in a possible design, the terminal device further includes an antenna system, under control of the processor, the antenna system receives and sends a wireless communication signal, to implement wireless communication with a mobile communications network, and the mobile communications network includes one or more of the following a GSM network, a CDMA network, a 3G network, an FDMA network, a TDMA network, a PDC network, a TACS network, an AMPS network, a WCDMA network, a TDSCDMA network, a WiFi network, and an LTE network.

According to the foregoing solutions, in the embodiments of the present disclosure, when the terminal is in the photographing state, in a scenario of a low signal-to-noise ratio, a sound source direction is determined using a method based on the interaural level difference such that noise can be effectively determined and noise can be effectively suppressed, thereby improving pickup precision of a target sound source during photographing, and improving user experience.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

In the embodiments of the present disclosure, a terminal may be a device that provides a user with a voice and/or data connectivity, a handheld device having a wireless connection function, or another processing device connected to a wireless modem, for example, a mobile phone (or referred to as a "cellular" phone), or may be a portable device, a pocket-sized device, a handheld device, or a wearable device (such as a smartwatch or a smart band), a tablet computer, a personal computer (PC, Personal Computer), a PDA (Personal Digital Assistant, personal digital assistant), a POS (Point of Sales, point of sales), or an in-vehicle computer.

Figure 1:
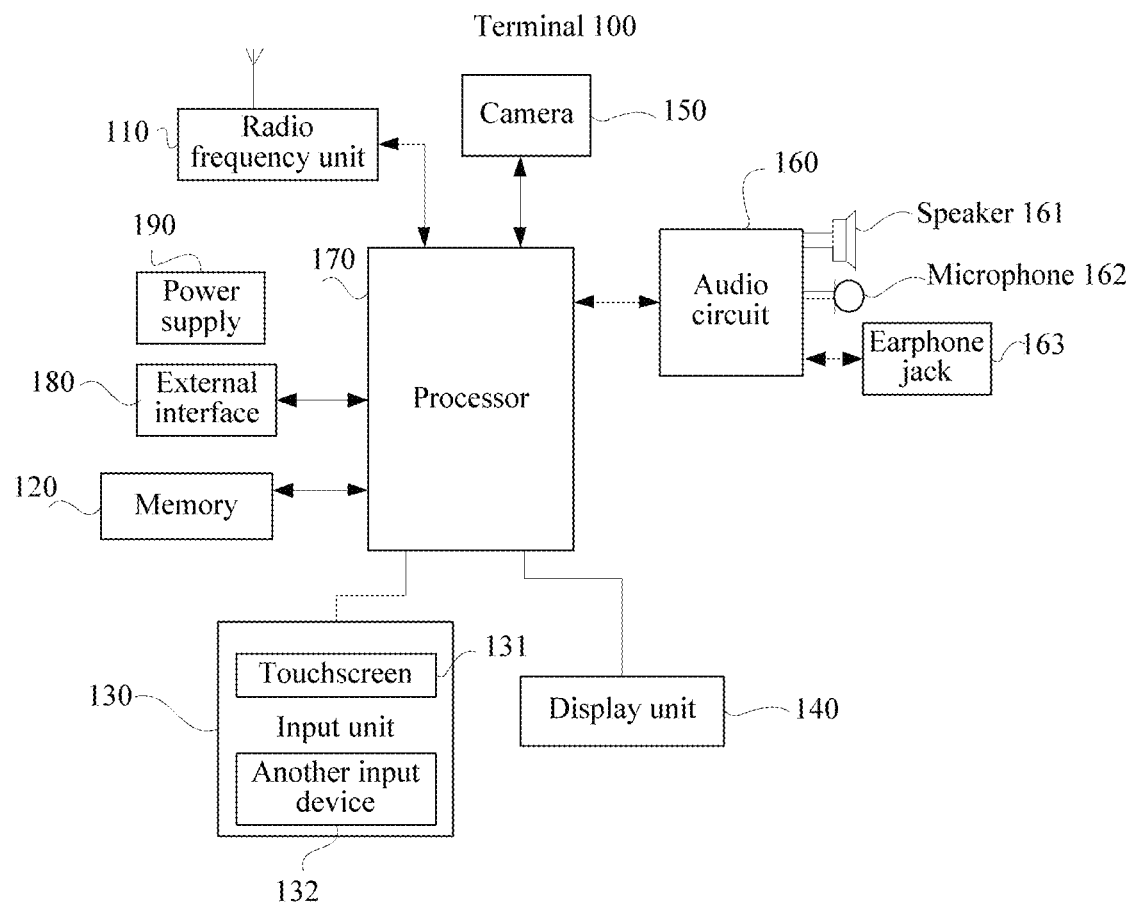
FIG. 1 is a schematic structural diagram of a terminal.

FIG. 1 is a schematic diagram of an optional hardware structure of a terminal 100.

Referring to FIG. 1, the terminal 100 may include components such as a radio frequency unit 110, a memory 120, an input unit 130, a display unit 140, a camera 150, an audio circuit 160, a speaker 161, microphones 162, a processor 170, an external interface 180, and a power supply 190. The microphones 162 may be simulation microphones or digital microphones, and can implement a normal microphone sound pickup function. In addition, there are at least two microphones, and an arrangement of the microphones needs to meet a particular requirement. For details, refer to several arrangements shown in FIG. 2A (two microphones in total, a top-front microphone and a top-back microphone of the terminal), FIG. 2B (three microphones in total, a top-front microphone, a top-back microphone, and a bottom microphone of the terminal), and FIG. 2C (four microphones in total, a top-front microphone, a top-back microphone, a bottom-left microphone, and a bottom-right microphone of the terminal). Certainly, another arrangement manner may be further included. Sound data acquired by the bottom microphone may be obtained using an operating system, to implement a basic call function.

FIG. 1 is merely an example of a portable multi-function apparatus and is not intended to limit the portable multi-function apparatus, and the apparatus may include more or fewer components than those shown in the figure, or some components may be combined, or different components are used.

The input unit 130 may be configured to receive input figure or character information, and generate a key signal input related to a user setting and function control of the portable multi-function apparatus. In an embodiment, the input unit 130 may include a touchscreen 131 and another input device 132. The touchscreen 131 may collect a touch operation of a user on or near the touchscreen 131 (such as an operation of the user on or near the touchscreen using any suitable object such as a finger, a joint, or a stylus), and drive a corresponding connection apparatus according to a preset program. The touchscreen may detect a touch operation of the user on the touchscreen, convert the touch operation to a touch signal and send the touch signal to the processor 170, and can receive and execute a command sent by the processor 170. The touch signal includes at least touch point coordinate information. The touchscreen 131 may provide an input interface and an output interface between the terminal 100 and the user. In addition, the touchscreen may be implemented in various types such as a resistance type, a capacitance type, an infrared type, and a surface acoustic wave type. In addition to the touchscreen 131, the input unit 130 may include the another input device. In an embodiment, the another input device 132 may include, but is not limited to, one or more of a physical keyboard, a function key (for example, a volume control key 132 or a power on/off key 133), a trackball, a mouse, or a joystick.

The display unit 140 may be configured to display information entered by the user or information provided for the user, and various menus of the terminal 100. Further, the touchscreen 131 may cover a display panel 141. After detecting a touch operation on or near the touchscreen 131, the touchscreen 141 transfers the touch operation to the processor 170, to determine a type of the touch event. Then, the processor 170 provides a corresponding visual output on the display panel 141 based on the type of the touch event. In this embodiment, the touchscreen and the display unit may be integrated into one component to implement an input function, an output function, and a display function of the terminal 100. For ease of description, in this embodiment of the present disclosure, a touch display screen combines functions of the touchscreen and the display unit. In some embodiments, the touchscreen and the display unit may be used as two independent components.

The memory 120 may be configured to store an instruction and data. The memory 120 may mainly include an instruction storage area and a data storage area. The data storage area may store an association relationship between a joint touch gesture and an application program function. The instruction storage area may store software units such as an operating system, an application, and an instruction required by at least one function, or a subset thereof, or an extended set thereof. The memory 120 may further include a non-volatile random access memory, and provide hardware, software, a data resource, and the like in a management and calculation processing device to the processor 170, to support control on software and an application. The memory 120 is further configured to store a multimedia file, and run a program and store an application.

The processor 170 is a control center of the terminal 100, and is connected to various parts of a mobile phone using various interfaces and lines. The processor 170 performs various functions and data processing of the terminal 100 by running or executing the instruction stored in the memory 120 and invoking the data stored in the memory 120, thereby implementing overall monitoring on the mobile phone. Optionally, the processor 170 may include one or more processing units. Preferably, the processor 170 may integrate an application processor and a modem processor. The application processor mainly processes an operating system, a user interface, an application program, and the like. The modem processor mainly processes wireless communication. It may be understood that the foregoing modem processor may not be integrated into the processor 170. In some embodiments, the processor and the memory may be implemented on a single chip. In other embodiments, the processor and the memory may be implemented on separate chips. The processor 170 may be further configured to generate a corresponding operation control signal, and send the operation control signal to a corresponding component in the calculation processing device, and read and process data in software, especially read and process the data and the program in the memory 120 such that function modules perform corresponding functions, to control a corresponding component to perform an operation as required by an instruction.

The camera 150 is configured to acquire an image or a video, and may be triggered and enabled using an application program instruction, to implement a photographing or a video recording function.

The radio frequency unit 110 may be configured to receive and send a signal during an information receiving and sending process or a call process. Particularly, the radio frequency unit receives downlink information from a base station, then delivers the downlink information to the processor 170 for processing, and sends related uplink data to the base station. Generally, the RF circuit includes, but is not limited to, an antenna, at least one amplifier, a transceiver, a coupler, a low noise amplifier (LNA), a duplexer, and the like. In addition, the radio frequency unit 110 may further communicate with a network device and another device through wireless communication. The wireless communication may use any communication standard or protocol, including, but not limited to, a GSM, a general packet radio service (GPRS), CDMA, WDCMA, LTE, an email, a Short Messaging Service (SMS), and the like.

The audio circuit 160, the speaker 161, and the microphone 162 may provide audio interfaces between the user and the terminal 100. The audio circuit 160 may convert received audio data into an electrical signal and transmit the electrical signal to the speaker 161. The speaker 161 converts the electrical signal into a sound signal for output. On the other hand, the microphone 162 is configured to acquire a sound signal, and may further convert an acquired sound signal into an electrical signal. The audio circuit 160 receives the electrical signal and then converts the electrical signal into audio data, and outputs the audio data to the processor 170 for processing. Then, the processor 170 sends the audio data to, for example, another terminal using the radio frequency unit 110, or outputs the audio data to the memory 120 for further processing. The audio circuit may further include an earphone jack 163 configured to provide a connection interface between the audio circuit and an earphone.

The terminal 100 further includes the power supply 190 (such as a battery) for supplying power to the components. Preferably, the power supply may be logically connected to the processor 170 using a power management system, thereby implementing functions such as charging, discharging, and power consumption management using the power management system.

The terminal 100 further includes the external interface 180. The external interface may be a standard Micro USB interface, or may be a multi-pin connector, and may be configured to connect the terminal 100 to another apparatus for communication, or may be configured to connect to a charger to charge the terminal 100.

Although not shown, the terminal 100 may further include a flash light, a WiFi module, a BLUETOOTH module, various sensors, and the like. Details are not described herein.

In some scenarios, when a user uses a mobile terminal such as a mobile phone to record a video or perform real-time photographing, the user usually expects that a recorded video includes no sound from the back of a camera. However, in an environment with a relatively low signal-to-noise ratio, an interference noise source from the back of the camera is easily positioned as a sound source within a photographing range of the camera. Consequently, incorrect determining on sound source positioning easily occurs, and accuracy is relatively low. Therefore, embodiments of the present disclosure provide a sound processing method and apparatus, to improve accuracy of sound source positioning, reduce incorrect determining, and effectively filter out noise from the back of the camera. The noise from the back of the camera may also be referred to as a backward sound signal in the embodiments of the present disclosure. By way of illustration, a plane in which a body of the terminal is located is used as a boundary, noise whose sound source is in a rear area of the camera (for example, for a front-facing camera, the back of the front-facing camera may be understood as an area at the back of a back surface of the body, for a rear-facing camera, the back of the rear-facing camera may be understood as an area in front of a front surface of the body) may be understood as a backward sound signal. A particular definition error is allowed for the area mentioned above.

Figure 2A:
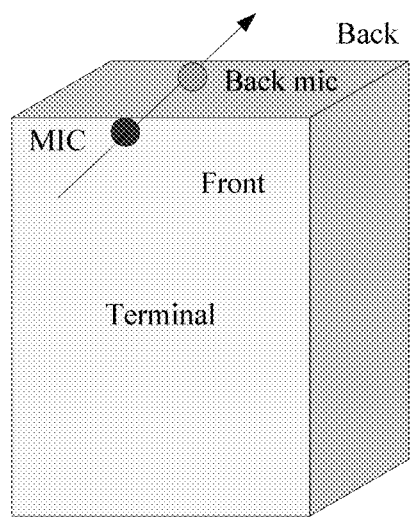
FIG. 2A, FIG. 2B, or FIG. 2C is a schematic diagram of an arrangement of microphones on a terminal according to an embodiment of the present disclosure.
Figure 2B:
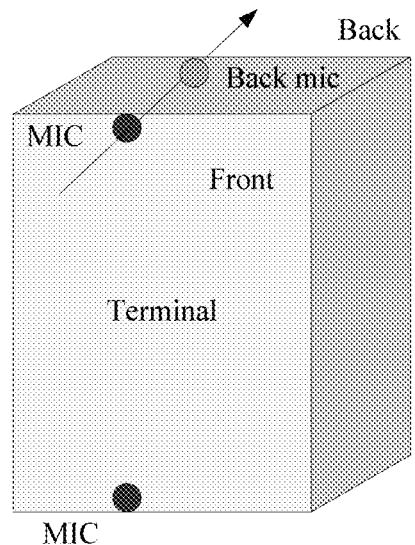
Figure 2C:
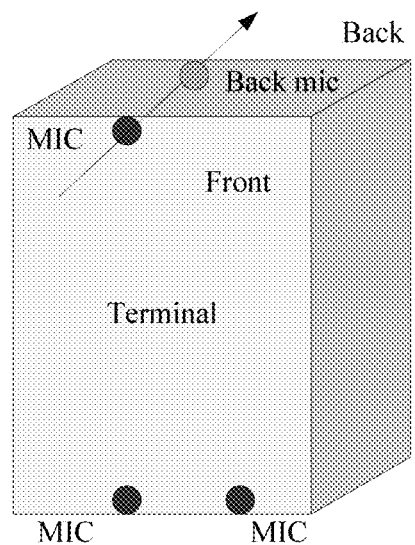
Figure 3:
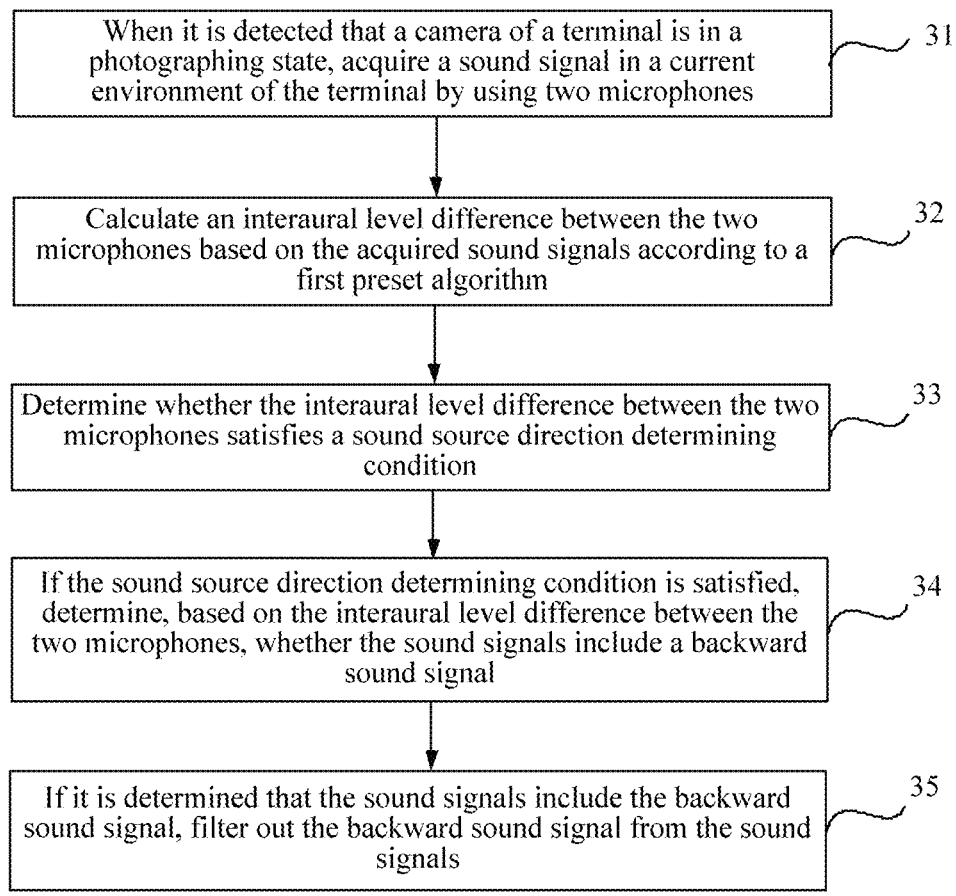
FIG. 3 is a flowchart of a sound processing method according to an embodiment of the present disclosure.

Referring to FIG. 3, an embodiment of the present disclosure provides a sound processing method. The method is applicable to terminal having two microphones at the top, the two microphones are respectively located on a front surface and a back surface of the terminal, and the terminal may be the terminal 100 shown in FIG. 1. A disposition manner of the microphones may be shown in any one of the arrangements in FIG. 2A, FIG. 2B, and FIG. 2C. A specific procedure includes the following steps.

Step 31: When it is detected that a camera of the terminal is in a photographing state, acquire a sound signal in a current environment of the terminal using the two microphones. In a time domain, a sound signal can be more finely divided into a sound signal of a frame. A length of a frame is related to a preset division algorithm. Therefore, each frame has a corresponding sound signal. Therefore, when the microphone is in a working state, the microphone can acquire a signal sound of a current frame.

Step 32: Calculate an interaural level difference between the two microphones based on the acquired sound signals according to a first preset algorithm.

In an embodiment, during calculation processing, calculation may be performed for a signal of each frame, to obtain an interaural level difference between the two microphones that corresponds to the frame.

Step 33: Determine whether the interaural level difference between the two microphones satisfies a sound source direction determining condition.

Step 34: If the sound source direction determining condition is satisfied, determine, based on the interaural level difference between the two microphones, whether the sound signals include a backward sound signal, where the backward sound signal is a sound signal whose sound source is located at the back of the camera. The backward sound signal may also be understood as a noise signal.

Step 35: If it is determined that the sound signals include the backward sound signal, filter out the backward sound signal from the sound signals.

In an embodiment, step 31 and step 32 may be implemented using the following processes.

The terminal may identify, using a preset detection program, whether the camera is in a turned-on state, for example, detect whether the camera is already enabled. When detecting that the camera is in the photographing state, the terminal acquires sound signals in the current environment using the top-front microphone and the top-back microphone of the terminal. Theoretically, the sound signals of the current frame may be respectively denoted as S1 and S2, power spectrums $P_1$ and $P_2$ of S1 and S2 are calculated based on S1 and S2 using a fast Fourier transformation (Fast Fourier Transformation, FFT) algorithm, and the interaural level difference between the two microphones is calculated based on $P_1$ and $P_2$. The sound signals may include signals of a plurality of frames. In addition, if the terminal has two cameras, in a specific implementation process of step 31, when it is detected that the camera is enabled, generally, whether the terminal uses a front-facing camera or a rear-facing camera may be further detected such that a processor can select a proper algorithm for subsequent signal processing based on a position of the camera.

A specific implementation process is as follows.

First, the sound signals acquired by the two microphones are sent to an FFT module. The FFT module is responsible for performing time-to-frequency conversion on the acquired sound signals, to obtain a signal spectrum. In an embodiment, the FFT module processes the signals through Short-time Fourier transform (Short-Time Fourier Transform, STFT).

Herein, using the top-front microphone and the top-back microphone as an example, assuming that sound signals picked up by the two microphones are $x_i(n)$, where i=1, 2, when the used camera is a front-facing camera, i=1, 2 respectively indicates the front microphone and the back microphone, or when the used camera is a rear-facing camera, i=1, 2 respectively indicates the back microphone and the front microphone, where n indicates a quantity of sampling points in a signal of a frame, and using a sampling rate of 8 k and a frame length of 10 ms as an example, n is equal to 80. A signal $x_i(N,l)$ is obtained after Fourier transformation, where N indicates a sending frequency point corresponding to a signal of a frame, l indicates a frame number, and any moment at which an $l^{th}$ frame is acquired may be understood as the current frame. A power spectrum of the signal is $P_i(k,l)=20\log_{10}|X_i^2(k,l)|$. The interaural level difference (interaural level difference, ILD) between the two mics that corresponds to the current frame is calculated using the following formula:

$$ILD_{now} = \frac{P_1 - P_2}{P_1 + P_2}$$

Photographing by the front-facing camera is used as an example, (when the rear-facing camera is used for photographing, a principle is similar to this), where $P_1$ indicates a power sound spectrum corresponding to the top-front microphone in the current frame, $P_2$ indicates a power sound spectrum corresponding to the top-back microphone in the current frame, $P_1$ and $P_2$ each are a vector having N elements, the N elements are values of N corresponding frequency points that are obtained after fast Fourier transformation is performed on the sound signals of the current frame, and N is an integer greater than 1, and $ILD_{now}$ is a vector including interaural level differences corresponding to the N frequency points, and a value of N is determined based on a preset frequency point division rule. The algorithm in the foregoing example is an implementation form of the first preset algorithm, and is not intended to impose a limitation.

Figure 4A:
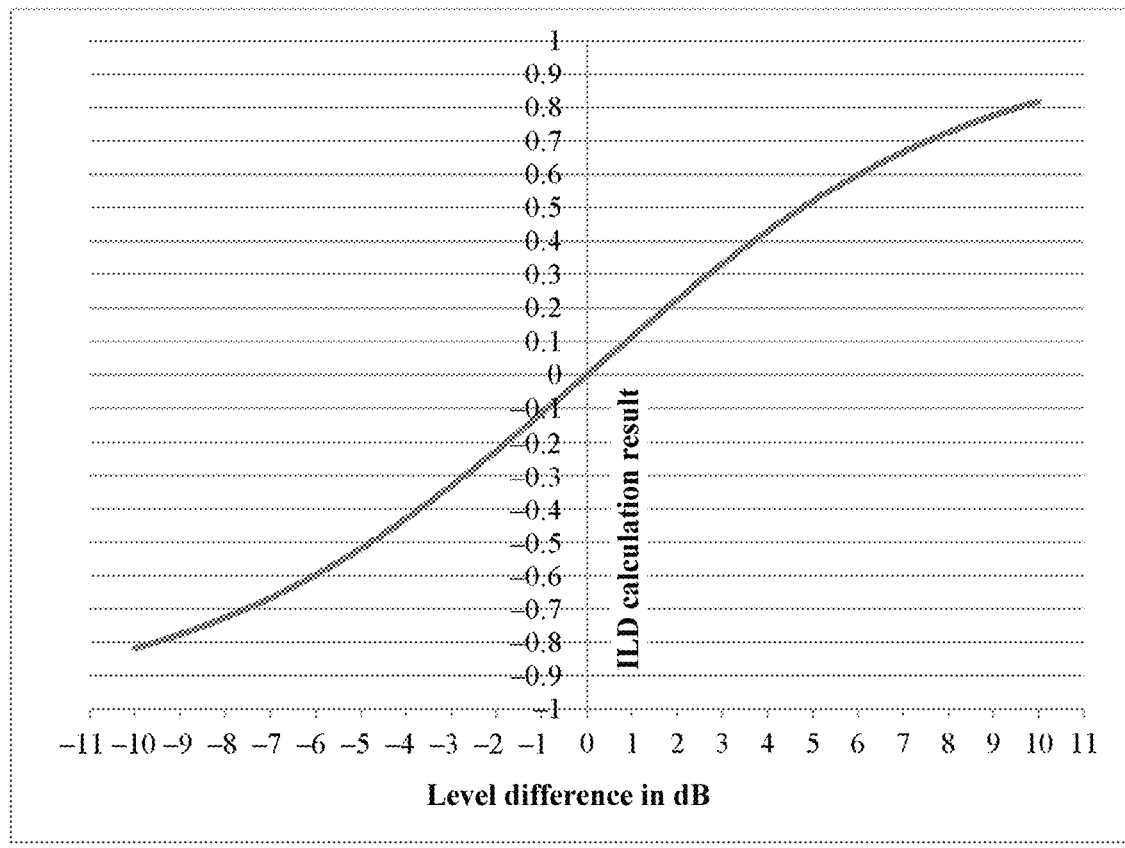
FIG. 4A is a schematic diagram of a relationship between an energy difference and an ILD between front and back microphones of a terminal.

FIG. 4A shows a relationship between an energy difference in decibel (dB) and an ILD between the top-front mic and the top-back mic.

As shown in FIG. 4A, a value range of the ILD is −1 to 1. 1 indicates that energy of the top-front microphone in the current frame is significantly greater than energy of the top-back microphone, and it is a forward sound signal, −1 indicates that energy of the top-back microphone in the current frame is significantly greater than energy of the top-front microphone, and it is a backward sound signal.

However, the backward sound signal can be more accurately determined using the interaural level difference only when the interaural level difference satisfies a particular condition. In an embodiment, step 33 of determining whether the interaural level difference between the two microphones satisfies a sound source direction determining condition includes the following process.

A maximum value of an interaural level difference between the two microphones that corresponds to a current frequency point and a minimum value of the interaural level difference are calculated using the interaural level difference between the two microphones that corresponds to the current frequency point, when a difference between the maximum value of the interaural level difference between the two microphones that corresponds to the current frequency point and the minimum value of the interaural level difference is greater than a first threshold, it is determined that the condition for determining a sound source direction using the interaural level difference is satisfied on the current frequency point, or when a difference between the maximum value of the interaural level difference and the minimum value of the interaural level difference is not greater than a first threshold, it is determined that the condition for determining a sound source direction using the interaural level difference is not satisfied on the current frequency point. If in a signal of a frame, M frequency points in N frequency points satisfy the sound source direction determining condition, it is determined that the interaural level difference between the two microphones for the current frame satisfies the sound source direction determining condition, where M is greater than or equal to N/2. To be specific, for the current frame, whether there is a backward sound signal may be determined using the interaural level difference.

Herein, $ILD_{max}$ is used to indicate a maximum value of an interaural level difference corresponding to an $i^{th}$ frequency point (one of frequency points corresponding to the current frame), $ILD_{min}$ is used to indicate a minimum value of the interaural level difference corresponding to the $i^{th}$ frequency point, on a first frequency point of an initial frame, $ILD_{max}$ and $ILD_{min}$ may be set to 0 or set to a preset interaural level difference between the top-front microphone and the top-back microphone. In an embodiment, when $ILD_{max} - ILD_{min}>$ a first threshold, it is considered that the interaural level difference between the two microphones satisfies the sound source direction determining condition on the $i^{th}$ frequency point, otherwise, it is considered that the sound source direction determining condition is not satisfied on the $i^{th}$ frequency point, where ILD max is the maximum value of the interaural level difference that is calculated based on the interaural level difference between the two microphones that corresponds to the $i^{th}$ frequency point, and ILD min is the minimum value of the interaural level difference that is calculated based on the interaural level difference between the two microphones that corresponds to the $i^{th}$ frequency point.

Calculation methods of $ILD_{max}$ and $ILD_{min}$ are as follows.

When the interaural level difference between the two microphones that corresponds to the $i^{th}$ frequency point is not greater than a maximum value of an interaural level difference corresponding to an $(i-1)^{th}$ frequency point (a previous frequency point), the maximum value of the interaural level difference between the two microphones that corresponds to the $i^{th}$ frequency point is calculated using the following formula:

$$ILD_{max}=\alpha_{low}*ILD_{now}+(1-\alpha_{low})*ILD_{max}', \text{ or}$$

when the interaural level difference between the two microphones that corresponds to the $i^{th}$ frequency point is greater than a maximum value of an interaural level difference corresponding to an $(i-1)^{th}$ frequency point (a previous frequency point), the maximum value of the interaural level difference between the two microphones that corresponds to the $i^{th}$ frequency point is calculated using the following formula:

$$ILD_{max}=\alpha_{fast}*ILD_{now}+(1-\alpha_{fast})*ILD_{max}', \text{ and}$$

when the interaural level difference between the two microphones that corresponds to the $i^{th}$ frequency point is greater than a minimum value of the interaural level difference corresponding to the $(i-1)^{th}$ frequency point (the previous frequency point), the minimum value of the interaural level difference between the two microphones that corresponds to the $i^{th}$ frequency point is calculated using the following formula:

$$ILD_{min}=\alpha_{low}*ILD_{now}+(1-\alpha_{low})*ILD_{min}', \text{ or}$$

when the interaural level difference between the two microphones that corresponds to the $i^{th}$ frequency point is not greater than a minimum value of the interaural level difference corresponding to the $(i-1)^{th}$ frequency point (the previous frequency point), the minimum value of the interaural level difference between the two microphones that corresponds to the $i^{th}$ frequency point is calculated using the following formula:

$$ILD_{min}=\alpha_{fast}*ILD_{now}+(1-\alpha_{fast})*ILD_{min}',$$

where $ILD_{now}$ indicates the interaural level difference between the two microphones that corresponds to the $i^{th}$ frequency point, $ILD_{max}$ indicates the maximum reference value corresponding to the $i^{th}$ frequency point, $ILD_{max}'$ indicates the maximum reference value corresponding to the $(i-1)^{th}$ frequency point, $ILD_{min}$ indicates the minimum reference value corresponding to the $i^{th}$ frequency point, $ILD_{min}'$ indicates the minimum reference value corresponding to the $(i-1)^{th}$ frequency point, and $\alpha_{fast}$ and $\alpha_{low}$ indicate preset step values, and $\alpha_{fast}>\alpha_{low}$. It is suggested that $\alpha_{fast}$ and $\alpha_{low}$ be respectively 0.95 and 0.05. It may be learned from the above that, $ILD_{max}$ is smoothly obtained based on an interaural level difference $ILD_{now}$ on the $i^{th}$ frequency point and the maximum value of the interaural level difference on the previous frequency point, and $ILD_{min}$ is smoothly obtained based on the interaural level difference $ILD_{now}$ on the $i^{th}$ frequency point and the minimum value of the interaural level difference on the previous frequency point.

Further, if the interaural level difference for the current frame satisfies the sound source determining condition, whether the sound signals of the current frame include a backward sound signal is determined based on the interaural level difference between the top-front microphone and the top-back microphone of the terminal, and when it is determined that the sound signals of the current frame include the backward sound signal, the backward signal is filtered out.

In a specific implementation process, as shown in FIG. 2A, when the terminal has one microphone arranged on the front surface at the top and one microphone arranged on the back surface at the top, step 34 may be, when an interaural level difference between the two microphones that corresponds to a $j^{th}$ frequency point is less than a second threshold, determining that the sound signals include a backward sound signal on the corresponding $j^{th}$ frequency point, or when an interaural level difference between the two microphones that corresponds to a $j^{th}$ frequency point is not less than a second threshold, determining that the sound signals include no backward sound signal on the corresponding $j^{th}$ frequency point.

Step 35 may include, when it is determined that the sound signals include a backward sound signal on the corresponding $j^{th}$ frequency point and the camera of the terminal that is performing photographing is the front-facing camera, using a sound signal acquired by the top-back microphone as a reference signal, and controlling an adaptive filter in the terminal to filter out a backward sound signal from a sound signal of the current frame that is acquired by the top-front microphone, or if the camera that is performing photographing is the rear-facing camera, using a sound signal acquired by the top-front microphone as a reference signal, and controlling an adaptive filter in the terminal to filter out a backward sound signal from a sound signal of the current frame that is acquired by the top-back microphone. For example, an NLMS adaptive filter solution may be used. A frequency domain filter is an equivalent form of a time domain filter. Principles of performing signal processing using the two filtering manners may be equivalent. These all are the prior art. A detailed filtering process is not described.

It should be noted that, the method is applicable to any terminal having front and back microphones at the top, for example, applicable to both terminals in FIG. 2B and FIG. 2C.

However, generally, a view angle range that can be photographed by the camera is approximately 120 degrees rather than an entire area in front of the camera. Therefore, there may be a noise signal whose sound source is located in front of the camera and located beyond a photographing range of the camera. Compared with the backward sound signal, this part of noise signals has relatively little impact on captured content, and may be defined as a secondary noise signal. A particular definition error is allowed for the area mentioned above. Therefore, in a specific implementation process, in addition to filtering out that part of noise, the backward sound signal, the secondary noise may be filtered out. Refer to the following two examples.

Example 1

The terminal has one microphone arranged on the front surface at the top, one microphone arranged on the back surface at the top, and one microphone arranged at the bottom. A case in which the terminal has one microphone arranged on the front surface at the top, one microphone arranged on the back surface at the top, and one microphone on the left side at the bottom is used as an example below. As shown in FIG. 2B, in this case, regardless of whether there is a backward sound signal before, the sound processing method may further include the following step.

Step 36: When the front-facing camera is used for photographing, perform delay difference based positioning on sound signals that are acquired by the bottom-left microphone and the top-front microphone, to obtain an up-down azimuth of the sound signals, and when the up-down azimuth is greater than a first preset angle, determine that the sound signals of the current frame include a secondary noise signal. The secondary noise signal is a noise signal located in front of the front-facing camera and located beyond a photographing range of the front-facing camera. When it is determined that the sound signals of the current frame include the secondary noise signal, a sound signal acquired by the top-back microphone is used as a reference signal, and the adaptive filter in the terminal is controlled to filter out the secondary noise signal from a sound signal of the current frame that is acquired by the top-front microphone.

When the rear-facing camera is used for photographing, delay difference based positioning may be performed on sound signals that are acquired by the bottom-left microphone and the top-back microphone, to obtain an up-down azimuth of the sound signals, and when the up-down azimuth is greater than a first preset angle (which may be the same as or different from the first preset angle in the previous paragraph), it is determined that the sound signals of the current frame include a secondary noise signal. In this case, the secondary noise signal is a noise signal located in front of the rear-facing camera and located beyond a photographing range of the rear-facing camera. When it is determined that the sound signals of the current frame include the secondary noise signal, a sound signal acquired by the top-front microphone is used as a reference signal, and the adaptive filter in the terminal is controlled to filter out the secondary noise signal from a sound signal of the current frame that is acquired by the top-front microphone.

In a specific implementation process, a principle for a case in which the terminal has one microphone arranged on the front surface at the top, one microphone arranged on the back surface at the top, and one microphone on the right side at the bottom is very similar to a principle in the foregoing example.

Example 2

When the terminal has one microphone arranged on the front surface at the top, one microphone on the back surface, one microphone arranged on the left side at the bottom, and one microphone arranged on the right side at the bottom, for ease of reference, the two microphones at the bottom may also be referred to as a third microphone and a fourth microphone. As shown in FIG. 2C, in this case, regardless of whether there is a backward sound signal before, the foregoing sound processing method may further include the following step.

Step 37: When the front-facing camera is used for photographing, perform delay difference based positioning on sound signals that are acquired by the bottom-left microphone and the top-front microphone, to obtain an up-down azimuth of the sound signals, and when the up-down azimuth is greater than a first preset angle, determine that the sound signals of the current frame include a secondary noise signal. The secondary noise signal is a noise signal located in front of the front-facing camera and located beyond a photographing range of the front-facing camera. Further, delay difference based positioning is performed on sound signals of the current frame that are acquired by the third microphone and the fourth microphone, to obtain a left-right azimuth of the sound signals of the current frame, and when the left-right azimuth is greater than a second preset angle, it is determined that the sound signals of the current frame include a secondary noise signal. According to the foregoing steps, when it is determined that the sound signals of the current frame include the secondary noise signal, a sound signal acquired by the top-back microphone is used as a reference signal, and the adaptive filter in the terminal is controlled to filter out all secondary noise signals from a sound signal of the current frame that is acquired by the top-front microphone. In addition, all noise that can be detected using the up-down azimuth and the left-right azimuth is secondary noise signals, but the up-down azimuth and the left-right azimuth focus on different directions of noise sources. For example, the up-down azimuth focuses more on detection of noise in an up-down direction in a plane in which the terminal is located, and the left-right azimuth focuses more on detection of noise in a left-right direction in the plane in which the terminal is located.

When the rear-facing camera is used for photographing, delay difference based positioning may be further performed on sound signals that are acquired by the bottom-left microphone and the top-back microphone, to obtain an up-down azimuth of the sound signals, and when the up-down azimuth is greater than a first preset angle, it is determined that the sound signals of the current frame include a secondary noise signal. In this case, the secondary noise signal is a noise signal located in front of the rear-facing camera and located beyond a photographing range of the rear-facing camera. Further, delay difference based positioning may be performed on sound signals of the current frame that are acquired by the third microphone and the fourth microphone, to obtain a left-right azimuth of the sound signals of the current frame, and when the left-right azimuth is greater than a second preset angle (which may be the same as or may be different from the second preset angle in the previous paragraph), it is determined that the sound signals of the current frame include a secondary noise signal. According to the foregoing steps, when it is determined that the sound signals of the current frame include the secondary noise signal, a sound signal acquired by the top-front microphone is used as a reference signal, and the adaptive filter in the terminal is controlled to filter out all secondary noise signals from a sound signal of the current frame that is acquired by the top-back microphone. In addition, all noise that can be detected using the up-down azimuth and the left-right azimuth is secondary noise signals, but the up-down azimuth and the left-right azimuth focus on different directions of noise sources. For example, the up-down azimuth focuses more on detection of noise in an up-down direction in a plane in which the terminal is located, and the left-right azimuth focuses more on detection of noise in a left-right direction in the plane in which the terminal is located.

It may be learned from the above that, a direction of a sound source in a front-rear direction may be estimated using information about the interaural level difference between the front and back microphones of the terminal. In addition, a direction of a sound source in a front-rear direction may be estimated using delay difference information, for example, an angle $\theta_1$ (a front-rear azimuth) in FIG. 4B, that is, an angle obtained by performing direction estimation using a delay difference between the front and back microphones. Herein, the front and back microphones are respectively the top-front microphone and the top-back microphone. For a specific calculation method, refer to a delay difference calculation method in FIG. 5. The delay difference calculation method is the prior art, and details are not described in the present disclosure.

Figure 4B:
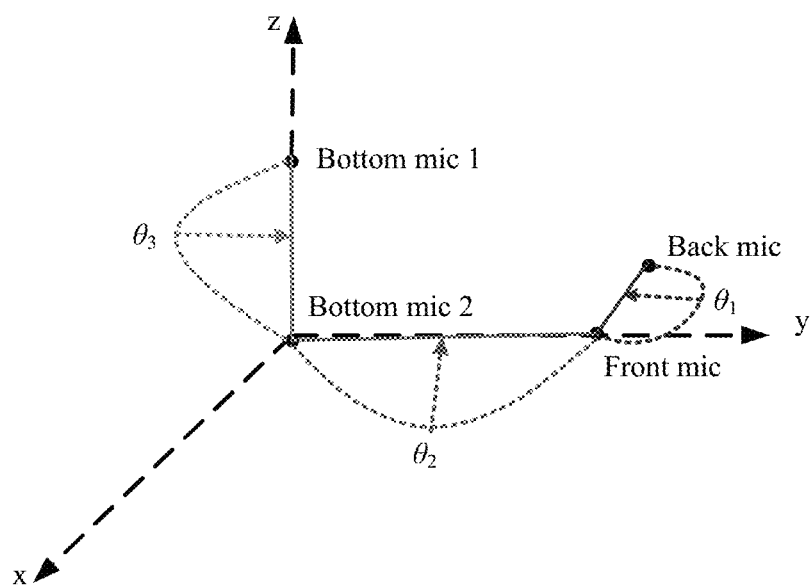
FIG. 4B is a schematic diagram of determining a sound source direction during sound source positioning using a microphone.

When there is a microphone at the bottom, it is similar to an arrangement of microphones in FIG. 2B. The bottom-left microphone is added and is indicated by a mic 2 in FIG. 4B. In this case, $\theta_2$ is calculated using the bottom mic 2 and the front mic based on an azimuth estimation method based on a delay difference. When there are two microphones at the bottom, it is similar to an arrangement of microphones in FIG. 2C. The bottom-left microphone and the bottom-right microphone are added and are respectively indicated by a mic 2 and a mic 1 in FIG. 4B. In this case, $\theta_3$ is calculated using the bottom mic 1 and the bottom mic 2 based on an azimuth estimation method based on a delay difference. As shown in FIG. 4B, angular parsing may be performed on an x axis in a space coordinate system including x, y, and z axes using the front and back mics, angular parsing may be performed on the y axis using the front mic and the bottom mic 2, and azimuth parsing may be performed on the z axis using the bottom mic 1 and the bottom mic 2.

In this case, a sound source positioning function in space can be implemented using the three angles $\theta_1$, $\theta_2$, and $\theta_3$ (the front-rear azimuth, and the left-right azimuth, and the up-down azimuth), to determine through positioning whether a target sound source is within the photographing range of the camera. For the front-rear direction, the left-right direction, and the up-down direction, a body of a mobile phone is used as a reference, for example, the front-rear direction is directions of a front surface and a back surface of the mobile phone, the left-right direction is directions of two sides of the body, and the up-down direction is directions of the top and the bottom of the body.

Still using the example in which the front-facing camera is used for photographing (note, although photographing by the rear-facing camera is a different scenario, but has a similar solution implementation principle, therefore, details are not described in the present disclosure, an application scenario is not limited, and this is applicable throughout the specification), it is well known that, a field of view of the camera is represented by two open angles, respectively, an open angle 1 and an open angle 2, on the terminal. The open angle 1 corresponds to a direction in the z axis, and the open angle corresponds to a direction in the y axis. In this algorithm, first, an angle estimation method based on an interaural level difference or a delay difference is used to distinguish between sound source signals in the front-rear direction, and then, $\theta_2$ is used to constrain an open angle in the y axis. When $\theta_2$ is greater than the open angle 2 of the camera, the sound signals include a secondary noise signal. This is similar to $\theta_3$. When $\theta_3$ is greater than the open angle 1, the sound signals include a secondary noise signal. It should be noted that, the secondary noise signal is a more superordinate concept, and secondary noise directions detected using determining methods using $\theta_2$ and $\theta_3$ are different. The method using $\theta_2$ mainly focuses on detection of secondary noise in the left-right direction, and the method using $\theta_3$ mainly focuses on detection of secondary noise in the up-down direction, and $\theta_2$ and $\theta_3$ can be mutually complementary in sound source direction determining.

In a specific implementation process, in the sound source positioning method based on an interaural level difference, when the arrangement of the microphones is shown in FIG. 2A, whether the sound signals of the current frame include a backward sound signal may be obtained, and when the signals of the current frame include no backward sound signal, a voice activity detection (VAD) identifier of 0 is output, or when the sound signals of the current frame include a backward sound signal, it is considered that a noise source is included, and a VAD identifier of 1 is output. When the arrangement of the microphones is shown in FIG. 2B or FIG. 2C, whether the sound signals of the current frame include a backward sound signal may be obtained, and when the sound signals of the current frame include a backward sound signal, a VAD identifier of 1 is output, or when the signals of the current frame include no backward sound signal, whether a secondary noise signal is included is further determined, and if no secondary noise signal is included, a voice activity detection (Voice Activity Detection, VAD) identifier of 0 is output, otherwise, a VAD identifier of 1 is output. The VAD identifier is 0 by default. In conclusion, if impact of a backward sound signal and impact of secondary noise are both considered, when current sound signals include either of the secondary noise and the backward sound signal, the VAD identifier is set to 1, or if only impact of a backward sound signal is considered, provided that the backward sound signal is included, the VAD identifier is set to 1. The former is more sensitive to a sound source, and has a higher requirement. This may be flexibly preconfigured by a user.

It should be noted that, when current ILD information is invalid, that is, it is determined, using the interaural level difference between the top-front microphone and the top-back microphone, that the condition for determining a sound source direction using the interaural level difference is not satisfied, determining on sound source positioning is performed using a conventional sound source positioning technology based on a phase difference. A specific method is shown as follows.

Figure 5:
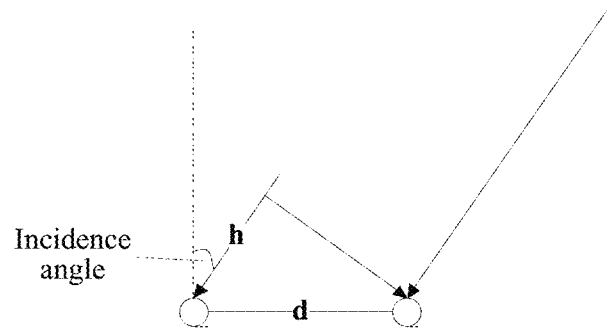
FIG. 5 is a principle diagram of a sound source positioning technology based on a phase difference.

As shown in FIG. 5, when far-field sound source signals are incident in parallel, due to different incidence angles, there is a time difference of arrival of the signals at the two mics. For a waveform signal having any frequency, time difference information is a phase variation, that is, a phase difference, of the waveform signal.

When an incidence angle is 0°, a phase difference is $$\varphi = 2\pi f \frac{d\sin\theta}{c},$$

where f is a frequency, c is the sound speed, and d is a distance between the mics. For incidence at 0°, herein, φ is equal to 0, and for incidence at 180°, φ is equal to π. In FIG. 5, h may be understood as a phase difference between the two mics, d is a maximum phase difference between the two mics, and the incidence angle=a sin(h/d). The maximum phase difference is $$2\pi f \frac{d}{c},$$

and the phase difference between the two mics is a phase angle difference between frequency point complex number signals (a complex number may be expressed using a trigonometric function as x=yi=|A|(cos θ+1 sin θ), where A is a modulus of the complex number).

There are many sound source positioning methods based on a phase difference for an entire frame. A relatively common method is a generalized cross-correlation (GCC) sound source positioning method. The GCC sound source positioning method is shown in FIG. 6.

Figure 6:
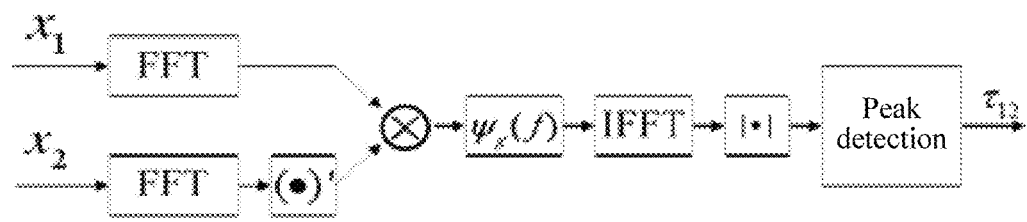
FIG. 6 is a schematic implementation diagram of a generalized cross-correlation sound source positioning method.

In FIG. 6, $x_1$ and $x_2$ are time domain signals received by the two mics, FFT is fast Fourier transformation, and a peak index obtained through calculation is $\tau_{12}$, that is, a quantity of corresponding delay sampling points such that the $$\text{time difference} = \frac{\tau_{12}}{Fs}.$$

The incidence angle may be calculated according to the following formula, the $$\text{incidence angle} = \arcsin \tau_{12} \frac{c}{dFs},$$

where c is the sound speed, d is the distance between the mics, and Fs is the sampling rate.

In the sound source positioning method based on a phase difference, an incidence angle for the entire frame and an incidence angle for a frequency point can be obtained for the signals of the current frame. When the incidence angle for the entire frame and the incidence angle for the frequency point are both beyond a beam pickup range (a beam range is preset), it is considered that the current sound signals include a backward sound signal, that is, a noise source, and the VAD identifier of 1 is output, otherwise, the VAD identifier of 0 is output. The VAD identifier is 0 by default.

In an embodiment, when the VAD identifier is output as 0, a sound signal acquired by the top-back microphone is used as a reference signal, and the adaptive filter in the terminal is controlled to filter out a noise signal from a sound signal acquired by the top-front microphone. A specific implementation process is as follows. The VAD identifier is output to a beamformer. Optionally, a normalized least mean square (NLMS) filter is used. The NLMS filter needs to adaptively generate a desired signal using a reference signal, and subtract the desired signal from a target signal, to obtain a residual signal, and use a minimum residual as a design orientation. A step of the NLMS filter is guided using the foregoing sound source positioning result, and when it is determined that a forward sound signal is a target sound source, the step of the filter is 0, and is not updated. When it is determined that a backward sound signal includes a noise source, the step of the filter is the largest, and is updated. Herein, a reference signal of the filter uses a signal in a direction opposite to a target user. For example, when a talker is directly in front of a screen, the reference signal selects a signal of the top-back mic of the terminal. Vice versa. An updated filter coefficient is multiplied by an input (in) signal, to obtain an output signal from which a backward noise component is filtered out.

Further, for a signal obtained after beamforming, a sound source positioning result is used to guide post-processing noise reduction after the beamforming. When a sound source positioning result on a frequency point is that noise is included, noise energy on the frequency point is updated, and a conventional Wiener filtering algorithm is used, to perform post-processing gain-clamping. For the signal obtained after the beamforming, further noise reduction processing is performed.

Next, a signal obtained after post-processing is sent to an echo cancellation module, to perform further echo cancellation. In the beamforming part and the post-processing part, a particular cancellation function is already achieved for an echo signal. In this scenario, a position of a speaker is generally at the bottom or at the back of the mobile phone, and a direction in which the speaker generates a signal is a noise direction. Therefore, compared with a conventional echo cancellation technology, beamforming and post-processing technologies for a microphone array can reduce an echo and can more easily cancel the echo.

When an intermediate-frequency signal and a high-frequency signal are blocked by the terminal, a significant blocking effect can be generated. In a scenario of a low signal-to-noise ratio or a plurality of sound sources, delay difference information is already very cloudy and is a mixture of sound sources in a plurality of direction. A sound source positioning result based on a delay difference shows randomicity. In this case, interaural level difference information is also mixed. However, provided that interaural level differences generated on the two mics for sound sources on the front surface and the back surface of the terminal are different, sound source positioning can be performed. Especially, in a scenario of a video call, when a sound source such as a talker or a noise source is close to the terminal, the interaural level difference information is more reliable.

In a specific implementation process, an arrangement of the mics on the terminal 100 includes, but is not limited to, any one of the arrangements in FIG. 2A, FIG. 2B, and FIG. 2C. The arrangement of the microphones in FIG. 2A, FIG. 2B, or FIG. 2C is a typical in-line type arrangement. When a quantity of microphones is increased, a sound pickup range for a beam can be better distinguished such that a beam range is more accurate, to implement 3D sound source positioning. When the arrangement of the microphones in FIG. 2A is used, front and back signals can be effectively distinguished. When the arrangement of the mics in FIG. 2B is used, front and back signals can be effectively distinguished. Because one mic is added at the bottom (whether a position is on the left side or on the right side is not limited), a sound source direction can be distinguished in the up-down direction of the mobile phone. When the arrangement of the mics in FIG. 2C is used, front and back signals can be effectively distinguished. Because two new mics that are distributed on the left and on the right are added at the bottom, sound source directions can be distinguished in the up-down direction and the left-right direction, to implement 3D sound source positioning.

The present disclosure provides the sound processing method. The method is applied to the terminal having the two microphones at the top, and the two microphones are respectively located on the front surface and the back surface of the terminal. When it is detected that the camera of the terminal is in the photographing state, the sound signals in the current environment are acquired using the two microphones, the interaural level difference between the two microphones is calculated based on the acquired sound signals of the current frame according to the first preset algorithm, whether the interaural level difference between the two microphones for the current frame satisfies the sound source direction determining condition is determined, if the sound source direction determining condition is satisfied, determine, based on the interaural level difference between the two microphones for the current frame, whether the sound signals of the current frame include a backward sound signal, where the backward sound signal is a sound signal whose sound source is located at the back of the camera, and if it is determined that the sound signals of the current frame include the backward sound signal, the backward sound signal is filtered out from the sound signals of the current frame. According to the method, during photographing, a noise signal beyond a photographing range can be filtered out, thereby ensuring sound quality of a video during photographing, and improving user experience.

Figure 7:
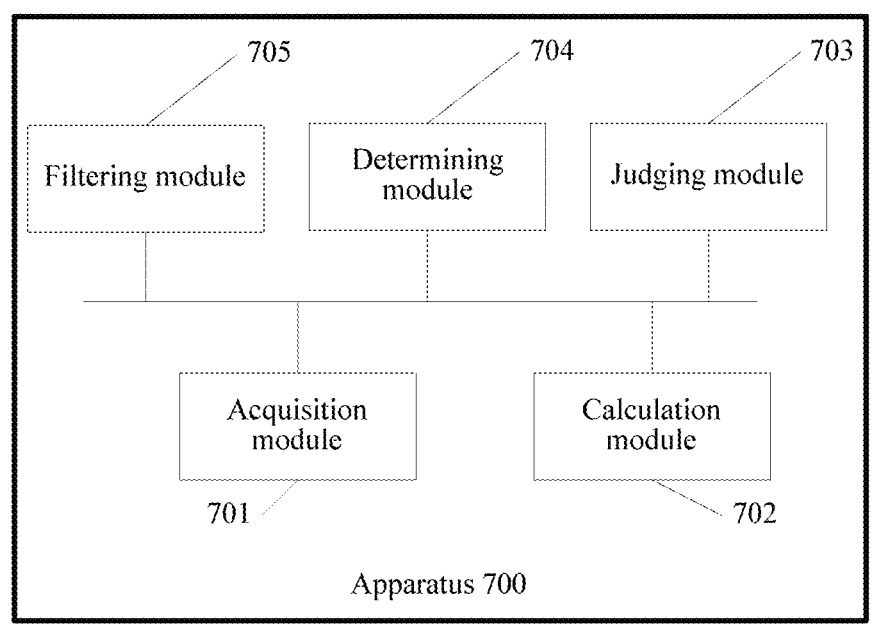
FIG. 7 is a schematic structural diagram of a sound processing apparatus according to an embodiment of the present disclosure.

As shown in FIG. 7, based on the sound processing method provided in the foregoing embodiment, an embodiment of the present disclosure provides a sound processing apparatus 700. The apparatus 700 is applied to a terminal having two microphones at the top, the two microphones are respectively located on a front surface and a back surface of the terminal, and as shown in FIG. 7, the apparatus 700 includes an acquisition module 701, a calculation module 702, a judging module 703, a determining module 704, and a filtering module 705.

The acquisition module 701 is configured to, when a camera of the terminal is in a photographing state, acquire a sound signal in a current environment of the terminal using the two microphones. The acquisition module may be implemented by a processor. A program instruction in a local memory or a cloud server may be invoked, to monitor whether a photographing function of the camera is enabled, and if it is detected that the camera is already enabled, the processor may further control the microphone to acquire a sound signal. Further, the acquired signal may be converted into a digital signal using an audio circuit.

In a specific implementation process, the acquisition module 701 may include a detection unit 701a and a receiving unit 701b. The detection unit 701a is configured to detect whether there is a camera in an enabled state, and can distinguish between front and back cameras. If it is detected that a camera is enabled, the receiving unit 701b further acquires a sound signal in the current environment. The two units can implement corresponding functions by invoking a program and an instruction in a memory by the processor.

The calculation module 702 is configured to calculate, according to a first preset algorithm, an interaural level difference between the two microphones based on the sound signals that are acquired by the acquisition module 701. The calculation module may be implemented by the processor. An interaural level difference algorithm program in the local memory or the cloud server may be invoked, to perform calculation processing on the acquired sound signals, to obtain the interaural level difference.

The judging module 703 is configured to determine whether the interaural level difference between the two microphones that is calculated by the calculation module 702 satisfies a sound source direction determining condition. The judging module may be implemented by the processor. A determining algorithm program in the local memory or the cloud server may be invoked, to perform corresponding calculation, to obtain a determining result. The determining module 704 is configured to, when the judging module 703 obtains that the sound source direction determining condition is satisfied, determine, based on the interaural level difference between the two microphones, whether the sound signals include a backward sound signal. The determining module may be implemented by the processor. When a result indicating that the condition is satisfied is received, a backward sound determining algorithm program in the local memory or the cloud server may be invoked, to determine whether the sound signals include a backward sound signal.

The filtering module 705 is configured to, if the determining module 704 determines that the sound signals include the backward sound signal, filter out the backward sound signal from the sound signals. The filtering module may be implemented by the processor. When it is determined that the sound signals include the backward sound signal, a noise filtering algorithm program in the local memory or the cloud server may be invoked, to filter out the backward sound signal from the sound signals.

However, generally, a view angle range that can be photographed by the camera is approximately 120 degrees rather than an entire area in front of the camera. Therefore, there may be a noise signal whose sound source is located in front of the camera and located beyond a photographing range of the camera. Compared with the backward sound signal, this part of noise signals has relatively little impact on captured content, and may be understood as a secondary noise signal. A particular definition error is allowed for the area mentioned above Therefore, in a specific implementation process, in addition to filtering out that part of noise the backward sound signal, the secondary noise may be filtered out. Refer to the following two examples.

Example 3

The terminal has one microphone arranged on the front surface at the top, one microphone arranged on the back surface at the top, and one microphone arranged at the bottom. A case in which the terminal has one microphone arranged on the front surface at the top, one microphone arranged on the back surface at the top, and one microphone on the left side at the bottom is used as an example below. As shown in FIG. 2B, in this case, regardless of whether there is a backward sound signal before, the apparatus may further include a secondary noise filtering module 706 configured to perform the following step, when the acquisition module 701 detects that the terminal uses the front-facing camera for photographing, performing delay difference based positioning on sound signals that are acquired by the bottom-left microphone and the top-front microphone, to obtain an up-down azimuth of the sound signals, and when the up-down azimuth is greater than a first preset angle, determining that the sound signals of the current frame include a secondary noise signal. The secondary noise signal is a noise signal located in front of the front-facing camera and located beyond a photographing range of the front-facing camera. When it is determined that the sound signals of the current frame include the secondary noise signal, a sound signal acquired by the top-back microphone is used as a reference signal, and the adaptive filter in the terminal is controlled to filter out the secondary noise signal from a sound signal of the current frame that is acquired by the top-front microphone.

When the acquisition module 701 detects that the rear-facing camera is used for photographing, delay difference based positioning may be performed on sound signals that are acquired by the bottom-left microphone and the top-back microphone, to obtain an up-down azimuth of the sound signals, and when the up-down azimuth is greater than a first preset angle (which may be the same as or different from the first preset angle in the previous paragraph), it is determined that the sound signals of the current frame include a secondary noise signal. In this case, the secondary noise signal is a noise signal located in front of the rear-facing camera and located beyond a photographing range of the rear-facing camera. When it is determined that the sound signals of the current frame include the secondary noise signal, a sound signal acquired by the top-front microphone is used as a reference signal, and the adaptive filter in the terminal is controlled to filter out the secondary noise signal from a sound signal of the current frame that is acquired by the top-front microphone.

Example 4

When the terminal has one microphone arranged on the front surface at the top, one microphone on the back surface, one microphone arranged on the left side at the bottom, and one microphone arranged on the right side at the bottom, for ease of reference, the two microphones at the bottom may also be referred to as a third microphone and a fourth microphone. As shown in FIG. 2C, in this case, regardless of whether there is a backward sound signal before, the apparatus may further include a secondary noise filtering module configured to perform the following step, when the acquisition module 701 detects that the terminal uses the front-facing camera for photographing, performing delay difference based positioning on sound signals that are acquired by the bottom-left microphone and the top-front microphone, to obtain an up-down azimuth of the sound signals, and when the up-down azimuth is greater than a first preset angle, determining that the sound signals of the current frame include a secondary noise signal. The secondary noise signal is a noise signal located in front of the front-facing camera and located beyond a photographing range of the front-facing camera. Further, delay difference based positioning is performed on sound signals of the current frame that are acquired by the third microphone and the fourth microphone, to obtain a left-right azimuth of the sound signals of the current frame, and when the left-right azimuth is greater than a second preset angle, it is determined that the sound signals of the current frame include a secondary noise signal. According to the foregoing steps, when it is determined that the sound signals of the current frame include the secondary noise signal, a sound signal acquired by the top-back microphone is used as a reference signal, and the adaptive filter in the terminal is controlled to filter out all secondary noise signals from a sound signal of the current frame that is acquired by the top-front microphone.

When the acquisition module 701 detects that the terminal uses the rear-facing camera for photographing, delay difference based positioning may be further performed on sound signals that are acquired by the bottom-left microphone and the top-back microphone, to obtain an up-down azimuth of the sound signals, and when the up-down azimuth is greater than a first preset angle, it is determined that the sound signals of the current frame include a secondary noise signal. In this case, the secondary noise signal is a noise signal located in front of the rear-facing camera and located beyond a photographing range of the rear-facing camera. Further, delay difference based positioning may be performed on sound signals of the current frame that are acquired by the third microphone and the fourth microphone, to obtain a left-right azimuth of the sound signals of the current frame, and when the left-right azimuth is greater than a second preset angle (which may be the same as or may be different from the second preset angle in the previous paragraph), it is determined that the sound signals of the current frame include a secondary noise signal. According to the foregoing steps, when it is determined that the sound signals of the current frame include the secondary noise signal, a sound signal acquired by the top-front microphone is used as a reference signal, and the adaptive filter in the terminal is controlled to filter out all secondary noise signals from a sound signal of the current frame that is acquired by the top-back microphone.

The secondary noise filtering module may be implemented by the processor. When it is determined that the sound signals include the secondary noise signal, a secondary noise filtering algorithm program in the local memory or the cloud server may be invoked, to filter out all secondary noise signals from the sound signals.

In a specific implementation process, the acquisition module 701 is configured to perform the method mentioned in step 31 and a method that may serve as an equivalent replacement, the calculation module 702 is configured to perform the method mentioned in step 32 and a method that may serve as an equivalent replacement, the judging module 703 is configured to perform the method mentioned in step 33 and a method that may serve as an equivalent replacement, the determining module 704 is configured to perform the method mentioned in step 34 and a method that may serve as an equivalent replacement, the filtering module 705 is configured to perform the method mentioned in step 35 and a method that may serve as an equivalent replacement, and the secondary noise filtering module 706 is configured to perform the method mentioned in step 36 or step 37 and a method that may serve as an equivalent replacement. The foregoing specific method embodiment and explanations and descriptions in the embodiment are also applicable to the method in the apparatus for execution.

The present disclosure provides the sound processing apparatus. The apparatus is applied to the terminal having the two microphones at the top, the two microphones are respectively located on the front surface and the back surface of the terminal, and the apparatus includes the acquisition module 701, the calculation module 702, the judging module 703, the determining module 704, and the filtering module 705. When it is detected that the camera of the terminal is in the photographing state, the acquisition module 701 acquires the sound signals in the current environment using the two microphones, the calculation module 702 calculates the interaural level difference between the two microphones based on the acquired sound signals of the current frame according to the first preset algorithm, the judging module 703 determines whether the interaural level difference between the two microphones for the current frame satisfies the sound source direction determining condition, if the sound source direction determining condition is satisfied, the determining module 704 determines, based on the interaural level difference between the two microphones for the current frame, whether the sound signals of the current frame include a backward sound signal, where the backward sound signal is a sound signal whose sound source is located at the back of the camera, and if it is determined that the sound signals of the current frame include the backward sound signal, the filtering module 705 filters out the backward sound signal from the sound signals of the current frame. According to the apparatus, during photographing, a noise signal beyond a photographing range can be filtered out, thereby ensuring sound quality of a video during photographing, and improving user experience.

It should be understood that, division of the modules in the apparatus 700 is merely logical function division. During actual implementation, all or some of the modules may be integrated into one physical entity, or the modules may be physically separate. For example, the modules may be independently disposed processing elements, or may be integrated into a chip in the terminal for implementation. In addition, the modules may be stored in a storage element in the controller in a form of program code, and a processing element in the processor invokes and performs functions of the modules. In addition, the modules may be integrated together or may be independently implemented. The processing element may be an integrated circuit chip and has a signal processing capability. In an implementation process, steps in the foregoing methods or the foregoing modules can be implemented using a hardware integrated logical circuit in the processing element, or using instructions in a form of software. The processing element may be a general-purpose processor, for example, a central processing unit (CPUrt), or may be one or more integrated circuits configured to implement the foregoing method, for example, one or more application-specific integrated circuits (ASIC), or one or more microprocessors (digital signal processor (DSP)), or one or more field-programmable gate arrays (FPGA).

The embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a compact disc read only memory (CD-ROM), an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device such that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A sound processing method applied to a terminal having two microphones respectively located on a front surface and a back surface of the terminal, and the method comprising:
  acquiring a plurality of sound signals of a current frame in a current environment of the terminal using the two microphones in response to a camera of the terminal being in a photographing state;
  calculating an interaural level difference between the two microphones based on the sound signals of the current frame according to a first preset algorithm;
  determining whether the interaural level difference between the two microphones satisfies a sound source direction determining condition;
  determining whether the sound signals of the current frame comprise a backward sound signal based on the interaural level difference between the two microphones in response to the sound source direction determining condition being satisfied, wherein the backward sound signal is a sound signal from a sound source located at the back of the camera; and
  filtering out the backward sound signal from the sound signals of the current frame in response to the sound signals of the current frame comprising the backward sound signal.

2. The method according to claim 1, wherein acquiring sound signals of the current frame in the current environment of the terminal using the two microphones comprises acquiring, using the two microphones, a sound signal (S1) and a sound signal (S2) of the current frame, wherein calculating the interaural level difference between the two microphones based on the sound signals according to the first preset algorithm comprises:
  calculating power spectrums $P_1$ and $P_2$ of S1 and S2 using a fast Fourier transformation (FFT) algorithm; and
  calculating the interaural level difference between the two microphones based on $P_1$ and $P_2$ using the following formula:

$$ILD_{now} = \frac{P_1 - P_2}{P_1 + P_2}$$

wherein $P_1$ indicates a power sound spectrum corresponding to a top-front microphone of the two microphones in the current frame, $P_2$ indicates a power sound spectrum corresponding to a top-back microphone of the two microphones in the current frame, wherein each of $P_1$ and $P_2$ is a vector having N elements, wherein the N elements are values of N corresponding frequency points that are obtained after FFT is performed on the sound signals of the current frame, wherein N is an integer greater than 1, and wherein $ILD_{now}$ is a vector comprising interaural level differences corresponding to the N frequency points.

3. The method according to claim 2, wherein determining whether the interaural level difference between the two microphones for the current frame satisfies the sound source direction determining condition comprises:
  calculating, according to a second preset algorithm using an interaural level difference between the two microphones that corresponds to an $i^{th}$ frequency point, a maximum reference value and a minimum reference value that correspond to the $i^{th}$ frequency point, wherein the $i^{th}$ frequency point is one of the N frequency points, and i is assumed to be all positive integers not greater than N; and
  determining that the interaural level difference between the two microphones satisfies the sound source direction determining condition on the $i^{th}$ frequency point in response to a difference between the maximum reference value and the minimum reference value of the $i^{th}$ frequency point being greater than a first threshold corresponding to the $i^{th}$ frequency point;
  determining that the interaural level difference between the two microphones does not satisfy the sound source direction determining condition on the $i^{th}$ frequency point in response to a difference between the maximum reference value and the minimum reference value not being greater than a first threshold corresponding to the $i^{th}$ frequency point; or
  determining that the interaural level difference between the two microphones for the current frame satisfies the sound source direction determining condition in response to M frequency points in the N frequency points satisfy the sound source direction determining condition, wherein M is greater than or equal to N/2.

4. The method according to claim 3, wherein calculating, according to the second preset algorithm using the interaural level difference between the two microphones that corresponds to an $i^{th}$ frequency point, the maximum reference value and the minimum reference value that correspond to the $i^{th}$ frequency point comprises:
   obtaining a maximum reference value corresponding to an $(i-1)^{th}$ frequency point, wherein the $(i-1)^{th}$ frequency point is a previous frequency point of the $i^{th}$ frequency point; and
   calculating the maximum reference value corresponding to the $i^{th}$ frequency point in response to an interaural level difference between the two microphones that corresponds to the $i^{th}$ frequency point not being greater than the maximum reference value corresponding to the $(i-1)^{th}$ frequency point using the following formula:

$ILD_{max} = \alpha_{low} * ILD_{now} + (1-\alpha_{low}) * ILD_{max}'$; or calculating the maximum reference value corresponding to the $i^{th}$ frequency point in response to the interaural level difference between the two microphones that corresponds to the $i^{th}$ frequency point being greater than the maximum reference value corresponding to the $(i-1)^{th}$ frequency point using the following formula:

$ILD_{max} = \alpha_{fast} * ILD_{now} + (1-\alpha_{fast}) * ILD_{max}'$; and obtaining a minimum reference value corresponding to the $(i-1)^{th}$ frequency point; and
   calculating the minimum reference value corresponding to the $i^{th}$ frequency point in response to the interaural level difference between the two microphones that corresponds to the $i^{th}$ frequency point being greater than the minimum reference value corresponding to the $(i-1)^{th}$ frequency point using the following formula:

$ILD_{min} = \alpha_{low} * ILD_{now} + (1-\alpha_{low}) * ILD_{min}'$; or calculating the minimum reference value corresponding to the $i^{th}$ frequency point in response to the interaural level difference between the two microphones that corresponds to the $i^{th}$ frequency point not being greater than the minimum reference value corresponding to the $(i-1)^{th}$ frequency point using the following formula:

$ILD_{min} = \alpha_{fast} * ILD_{now} + (1-\alpha_{fast}) * ILD_{min}'$, wherein $ILD_{now}$ indicates the interaural level difference between the two microphones corresponding to the $i^{th}$ frequency point, $ILD_{max}$ indicates the maximum reference value corresponding to the $i^{th}$ frequency point, $ILD_{max}'$ indicates the maximum reference value corresponding to the $(i-1)^{th}$ frequency point, $ILD_{min}$ indicates the minimum reference value corresponding to the $i^{th}$ frequency point, $ILD_{min}'$ indicates the minimum reference value corresponding to the $(i-1)^{th}$ frequency point, and $\alpha_{fast}$ and $\alpha_{low}$ indicate preset step values, and $\alpha_{fast} > \alpha_{low}$.

5. The method according to claim 3, wherein determining whether the sound signals of the current frame comprise the backward sound signal based on the interaural level difference between the two microphones for the current frame comprises:
   determining that the backward sound signal is comprised on the $j^{th}$ frequency point in response to an interaural level difference corresponding to a $j^{th}$ frequency point being less than a second threshold corresponding to the $j^{th}$ frequency point, wherein the $j^{th}$ frequency point is one of the M frequency points, and j is assumed to be all positive integers not greater than the M; or
   determining that no backward sound signal is comprised on the $j^{th}$ frequency point in response the interaural level difference between the two microphones that corresponds to the $j^{th}$ frequency point not being less than a second threshold.

6. The method according to claim 1, wherein filtering out the backward sound signal from the sound signals of the current frame comprises:
   using a sound signal acquired by a top-back microphone of the two microphones as a reference signal in response to the camera of the terminal that is performing photographing being a front-facing camera; and
   controlling an adaptive filter in the terminal to filter out the backward sound signal from the sound signal of the current frame that is acquired by the top-front microphone in response to the camera of the terminal being a front-facing camera; or
   using a sound signal acquired by a top-front microphone of the two microphones as the reference signal being the camera of the terminal being a rear-facing camera; and
   controlling an adaptive filter in the terminal to filter out the backward sound signal from a sound signal of the current frame that is acquired by the top-back microphone.

7. The method according to claim 1, wherein the terminal further comprises a third microphone at a bottom of the terminal, wherein the camera is a front-facing camera, and wherein the method further comprises:
   performing delay difference based positioning on third sound signals of the current frame that are acquired by the third microphone and a top-front microphone of the two microphones to obtain an up-down azimuth of the third sound signals of the current frame;
   determining that the third sound signals of the current frame comprise a secondary noise signal in response to the up-down azimuth being greater than a first preset angle, wherein the secondary noise signal is a noise signal located in front of the front-facing camera and beyond a photographing range of the front-facing camera;
   using a fourth sound signal acquired by a top-back microphone of the two microphones as a reference signal; and
   controlling an adaptive filter in the terminal to filter out the secondary noise signal from a sound signal of the current frame that is acquired by the top-front microphone.

8. The method according to claim 7, wherein the terminal further comprises a fourth microphone at the bottom of the terminal, wherein the third microphone and the fourth microphone are arranged at the bottom of the terminal from left to right, and wherein the method further comprises:
   performing delay difference based positioning on a plurality of sound signals of the current frame that are acquired by the third microphone and the fourth microphone to obtain a left-right azimuth of the sound signals of the current frame;
   determining that the sound signals of the current frame comprise a secondary noise signal in response to the left-right azimuth being greater than a second preset angle;
   using a sound signal acquired by a top-back microphone as a reference signal in response to the sound signals of the current frame comprising the secondary noise signal; and controlling the adaptive filter in the terminal to filter out the secondary noise signal from a sound signal of the current frame that is acquired by the top-front microphone.

9. The method according to claim 1, wherein the terminal further comprises a third microphone at a bottom of the terminal, wherein the camera is a rear-facing camera, and wherein the method further comprises:
performing delay difference based positioning on third sound signals of the current frame that are acquired by the third microphone and a top-back microphone of the two microphones to obtain an up-down azimuth of the third sound signals of the current frame;
determining that the third sound signals of the current frame comprise a secondary noise signal in response to the up-down azimuth being greater than a first preset angle, wherein the secondary noise signal is a noise signal located in front of the rear-facing camera and beyond a photographing range of the rear-facing camera;
using a fourth sound signal acquired by a top-front microphone of the two microphones as a reference signal in response to the sound signals of the current frame comprising the secondary noise signal; and
controlling the adaptive filter in the terminal to filter out the secondary noise signal from a sound signal of the current frame that is acquired by the top-back microphone.

10. The method according to claim 9, wherein the terminal further comprises a fourth microphone at the bottom of the terminal, wherein the third microphone and the fourth microphone are arranged at the bottom of the terminal from left to right, wherein the method further comprises:
performing delay difference based positioning on a plurality of sound signals of the current frame that are acquired by the third microphone and the fourth microphone to obtain a left-right azimuth of the sound signals of the current frame;
determining that the sound signals of the current frame comprise a secondary noise signal in response to the left-right azimuth being greater than a second preset angle;
using a sound signal acquired by the top-front microphone as a reference signal in response to the sound signals of the current frame comprise the secondary noise signal; and
controlling the adaptive filter in the terminal to filter out the secondary noise signal from a sound signal of the current frame that is acquired by the top-back microphone.

11. A terminal, comprising:
two microphones positioned at a top of the terminal, wherein the two microphones are respectively located on a front surface and a back surface of the terminal; and
a processor coupled to the two microphones and configured to:
acquire a plurality sound signals of a current frame in a current environment of the terminal using the two microphones in response to a camera of the terminal is in a photographing state;
calculate an interaural level difference between the two microphones based on the sound signals of the current frame according to a first preset algorithm;
determine whether the interaural level difference between the two microphones satisfies a sound source direction determining condition;
determine whether the sound signals of the current frame comprise a backward sound signal based on the interaural level difference between the two microphones for the current frame in response to the sound source direction determining condition being satisfied, wherein the backward sound signal is a sound signal from a sound source located at the back of the camera; and
filter out the backward sound signal from the sound signals of the current frame in response to the sound signals of the current frame comprising the backward sound signal.

12. The terminal according to claim 11, wherein the processor is further configured to:
acquire, using the two microphones, a sound signal (S1) and a sound signal (S2) of the current frame;
calculate power spectrums $P_1$ and $P_2$ of S1 and S2 using a fast Fourier transformation (FFT) algorithm; and
calculate the interaural level difference between the two microphones based on $P_1$ and $P_2$ using the following formula:

$$ILD_{now} = \frac{P_1 - P_2}{P_1 + P_2}$$

wherein $P_1$ indicates a power sound spectrum corresponding to a top-front microphone of the two microphones in the current frame, $P_2$ indicates a power sound spectrum corresponding to a top-back microphone of the two microphones in the current frame, wherein each of $P_1$ and $P_2$ is a vector having N elements, wherein the N elements are values of N corresponding frequency points that are obtained after FFT is performed on the sound signals of the current frame, wherein N is an integer greater than 1, and wherein $ILD_{now}$ is a vector comprising interaural level differences corresponding to the N frequency points.

13. The terminal according to claim 12, wherein the processor is further configured to:
calculate, according to a second preset algorithm using an interaural level difference between the two microphones that corresponds to an $i^{th}$ frequency point, a maximum reference value and a minimum reference value that correspond to the $i^{th}$ frequency point, wherein the $i^{th}$ frequency point is one of the N frequency points, and i is assumed to be all positive integers not greater than N; and
determine that the interaural level difference between the two microphones satisfies the sound source direction determining condition on the $i^{th}$ frequency point in response to a difference between the maximum reference value and the minimum reference value of the $i^{th}$ frequency point being greater than a first threshold corresponding to the $i^{th}$ frequency point;
determine that the interaural level difference between the two microphones does not satisfy the sound source direction determining condition on the $i^{th}$ frequency point in response to a difference between the maximum reference value and the minimum reference value not being greater than a first threshold corresponding to the $i^{th}$ frequency point; or
determine that the interaural level difference between the two microphones for the current frame satisfies the sound source direction determining condition in response to M frequency points in the N frequency points satisfy the sound source direction determining condition, wherein M is greater than or equal to N/2.

14. The terminal according to claim 13, wherein the processor is further configured to:
   obtain a maximum reference value corresponding to an $(i-1)^{th}$ frequency point, wherein the $(i-1)^{th}$ frequency point is a previous frequency point of the $i^{th}$ frequency point; and
   calculate the maximum reference value corresponding to the $i^{th}$ frequency point in response to an interaural level difference between the two microphones that corresponds to the $i^{th}$ frequency point is not greater than the maximum reference value corresponding to the $(i-1)^{th}$ frequency point using the following formula:

$ILD_{max} = \alpha_{low} * ILD_{now} + (1-\alpha_{low}) * ILD_{max}'$; or calculate the maximum reference value corresponding to the $i^{th}$ frequency point in response to the interaural level difference between the two microphones that corresponds to the $i^{th}$ frequency point being greater than the maximum reference value corresponding to the $(i-1)^{th}$ frequency point using the following formula:

$ILD_{max} = \alpha_{fast} * ILD_{now} + (1-\alpha_{fast}) * ILD_{max}'$; and obtaining a minimum reference value corresponding to the $(i-1)^{th}$ frequency point; and
   calculate the minimum reference value corresponding to the $i^{th}$ frequency point in response to the interaural level difference between the two microphones that corresponds to the $i^{th}$ frequency point being greater than the minimum reference value corresponding to the $(i-1)^{th}$ frequency point using the following formula using the following formula:

$ILD_{min} = \alpha_{low} * ILD_{now} + (1-\alpha_{low}) * ILD_{min}'$; or calculate the minimum reference value corresponding to the $i^{th}$ frequency point in response to the interaural level difference between the two microphones that corresponds to the $i^{th}$ frequency point not being greater than the minimum reference value corresponding to the $(i-1)^{th}$ frequency point using the following formula:

$ILD_{min} = \alpha_{fast} * ILD_{now} + (1-\alpha_{fast}) * ILD_{min}'$, wherein $ILD_{now}$ indicates the interaural level difference between the two microphones corresponding to the $i^{th}$ frequency point, $ILD_{max}$ indicates the maximum reference value corresponding to the $i^{th}$ frequency point, $ILD_{max}'$ indicates the maximum reference value corresponding to the $(i-1)^{th}$ frequency point, $ILD_{min}$ indicates the minimum reference value corresponding to the $i^{th}$ frequency point, $ILD_{min}'$ indicates the minimum reference value corresponding to the $(i-1)^{th}$ frequency point, and $\alpha_{fast}$ and $\alpha_{low}$ indicate preset step values, and $\alpha_{fast} > \alpha_{lo}$.

15. The terminal according to claim 11, wherein the processor is further configured to:
   determine that the backward sound signal is comprised on the $j^{th}$ frequency point in response to an interaural level difference corresponding to a $j^{th}$ frequency point is less than a second threshold corresponding to the $j^{th}$ frequency point, wherein the $j^{th}$ frequency point is one of the M frequency points, and j is assumed to be all positive integers not greater than the M; or
   determine that no backward sound signal is comprised on the $j^{th}$ frequency point in response to the interaural level difference between the two microphones that corresponds to the $j^{th}$ frequency point is not less than a second threshold.

16. The terminal according to claim 11, wherein the processor is further configured to:
   use a sound signal acquired by the top-back microphone as a reference signal in response to the camera of the terminal that is performing photographing is a front-facing camera; and
   control an adaptive filter in the terminal to filter out the backward sound signal from the sound signal of the current frame that is acquired by the top-front microphone in response to the camera of the terminal being a front-facing camera; or
   use a sound signal acquired by a top-front microphone of the two microphones as the reference signal in response to the camera of the terminal that is performing photographing being a rear-facing camera; and
   control an adaptive filter in the terminal to filter out the backward sound signal from a sound signal of the current frame that is acquired by the top-back microphone.

17. The terminal according to claim 11, wherein when the terminal further comprises a third microphone at a bottom of the terminal, wherein the camera is a front-facing camera, and wherein the processor is further configured to:
   perform delay difference based positioning on third sound signals of the current frame that are acquired by the third microphone and a top-front microphone of the two microphones to obtain an up-down azimuth of the third sound signals of the current frame;
   determine that the third sound signals of the current frame comprise a secondary noise signal in response to the up-down azimuth being greater than a first preset angle, wherein the secondary noise signal is a noise signal located in front of the front-facing camera and beyond a photographing range of the front-facing camera;
   use a fourth sound signal acquired by a top-back microphone of the two microphones as a reference signal; and
   control an adaptive filter in the terminal to filter out the secondary noise signal from a sound signal of the current frame that is acquired by the top-front microphone.

18. The terminal according to claim 17, wherein the terminal further comprises a fourth microphone at the bottom of the terminal, wherein the third microphone and the fourth microphone are arranged at the bottom of the terminal from left to right, and wherein the processor is further configured to:
   perform delay difference based positioning on a plurality of sound signals of the current frame that are acquired by the third microphone and the fourth microphone to obtain a left-right azimuth of the sound signals of the current frame;
   determine that the sound signals of the current frame comprise a secondary noise signal in response to the left-right azimuth being greater than a second preset angle;
   use a sound signal acquired by a top-back microphone as the reference signal in response to the sound signals of the current frame comprising the secondary noise signal; and
   control the adaptive filter in the terminal to filter out the secondary noise signal from a sound signal of the current frame that is acquired by the top-front microphone.

19. The terminal according to claim 11, wherein the terminal further comprises a third microphone at a bottom of the terminal, wherein the camera is a rear-facing camera, and wherein is further configured to:
- perform delay difference based positioning on third sound signals of the current frame that are acquired by the third microphone and a top-back microphone of the two microphones to obtain an up-down azimuth of the third sound signals of the current frame;
- determine that the third sound signals of the current frame comprise a secondary noise signal in response to the up-down azimuth being greater than a first preset angle, wherein the secondary noise signal is a noise signal located in front of the rear-facing camera and beyond a photographing range of the rear-facing camera;
- use a sound signal acquired by the top-front microphone as a reference signal in response to the sound signals of the current frame comprising the secondary noise signal; and
- control the adaptive filter in the terminal to filter out the secondary noise signal from a sound signal of the current frame that is acquired by the top-back microphone.

20. The terminal according to claim 19, wherein the terminal further comprises a fourth microphone at the bottom of the terminal, wherein the third microphone and the fourth microphone are arranged at the bottom of the terminal from left to right, and wherein the processor is further configured to:
- perform delay difference based positioning on a plurality of sound signals of the current frame that are acquired by the third microphone and the fourth microphone, to obtain a left-right azimuth of the sound signals of the current frame;
- determine that the sound signals of the current frame comprise a secondary noise signal in response to the left-right azimuth being greater than a second preset angle;
- use a sound signal acquired by the top-front microphone as a reference signal in response to the sound signals of the current frame comprising the secondary noise signal; and
- control the adaptive filter in the terminal to filter out the secondary noise signal from a sound signal of the current frame that is acquired by the top-back microphone.

21. A terminal device, comprising:
- a plurality of microphones configured to acquire a sound signal,
- a camera configured to acquire an image signal;
- a memory configured to store configured to store instructions; and
- a processor coupled to the memory configured to invoke the instructions to cause the processor to be configured to:
  - acquire a plurality of sound signals of a current frame in a current environment of the terminal device using the microphones in response to the camera being in a photographing state;
  - calculate an interaural level difference between the microphones based on the sound signals of the current frame according to a first preset algorithm;
  - determine whether the interaural level difference between the microphones satisfies a sound source direction determining condition;
  - determine whether the sound signals of the current frame comprise a backward sound signal based on the interaural level difference between the microphones in response to the sound source direction determining condition being satisfied, wherein the backward sound signal is a sound signal from a sound source located at the back of the camera; and
  - filter out the backward sound signal from the sound signals of the current frame in response to the sound signals of the current frame comprising the backward sound signal.

22. The terminal device according to claim 21, further comprising an antenna system coupled to the processor and configured to receive and send a wireless communication signal to implement wireless communication with a mobile communications network, and wherein the mobile communications network comprises at least one of a Global System for Mobile Communications (GSM) network, a Code Division Multiple Access (CDMA) network, a third generation (3G) network, a Frequency Division Multiple Access (FDMA) network, a Time Division Multiple Access (TDMA) network, a Primary Domain Controller (PDC) network, a Total Access Communication System (TACS) network, an Advanced Mobile Phone System (AMPS) network, a Wideband Code Division Multiple Access (WCDMA) network, a Time Division Synchronous Code Multiple Access (TDSCDMA) network, a wireless fidelity (WiFi) network, and an Long Term Evolution (LTE) network.

* * * * *